Aug. 6, 1940.     E. BREITLING ET AL     2,210,021
PRINTING MEANS FOR CASH REGISTERS, ACCOUNTING, AND THE LIKE MACHINES
Filed July 22, 1937     21 Sheets-Sheet 1
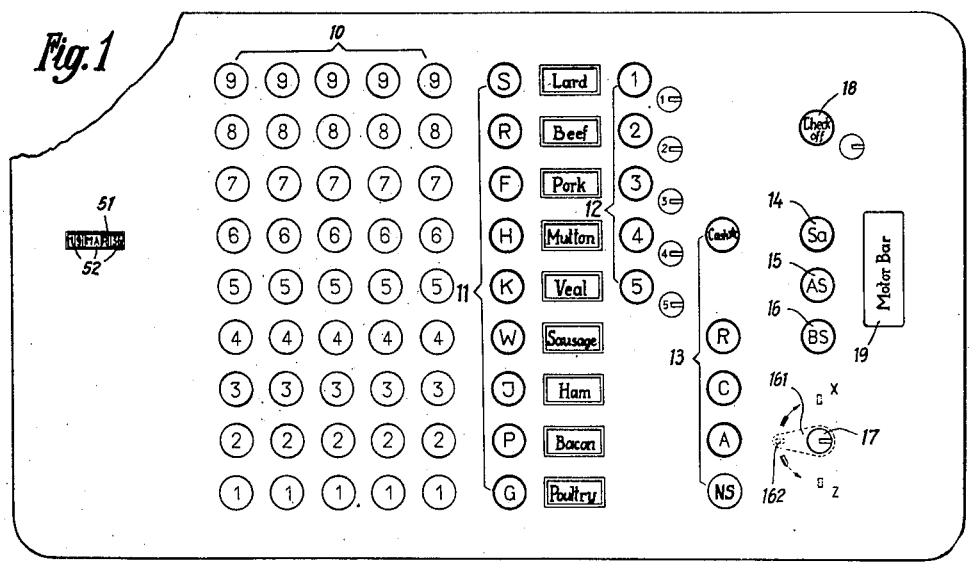
Inventors
Ernst Breitling and
Georg Topel
By Carl Benet
Their Attorney

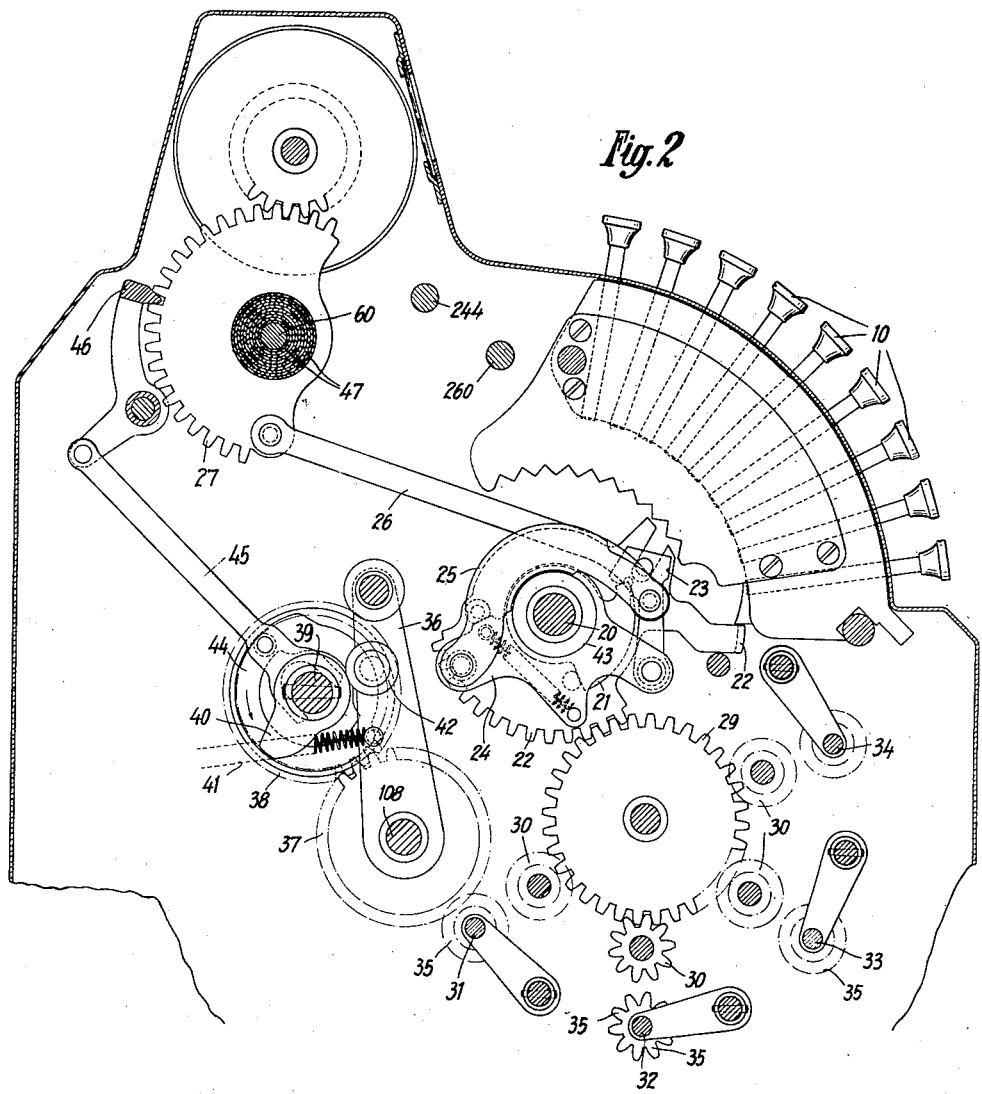

Inventors
Ernst Breitling and
Georg Topel
By Carl Beust
Their Attorney

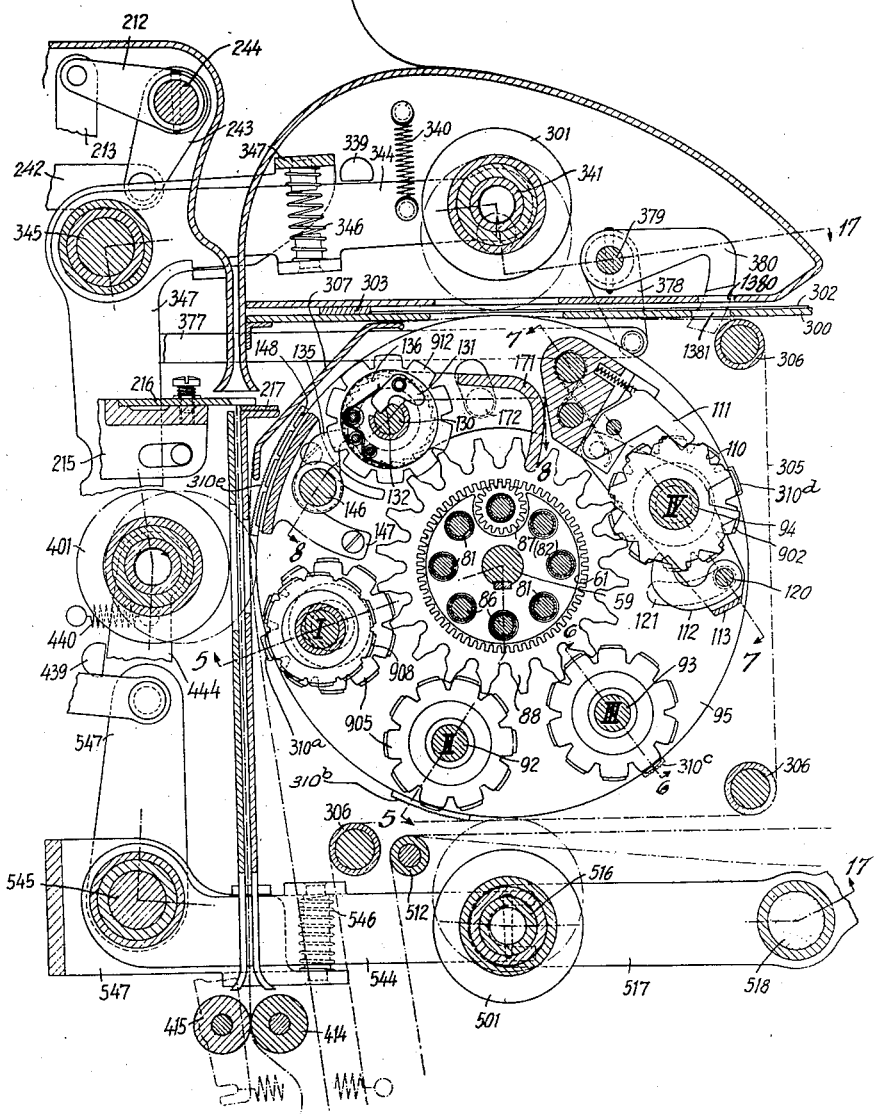

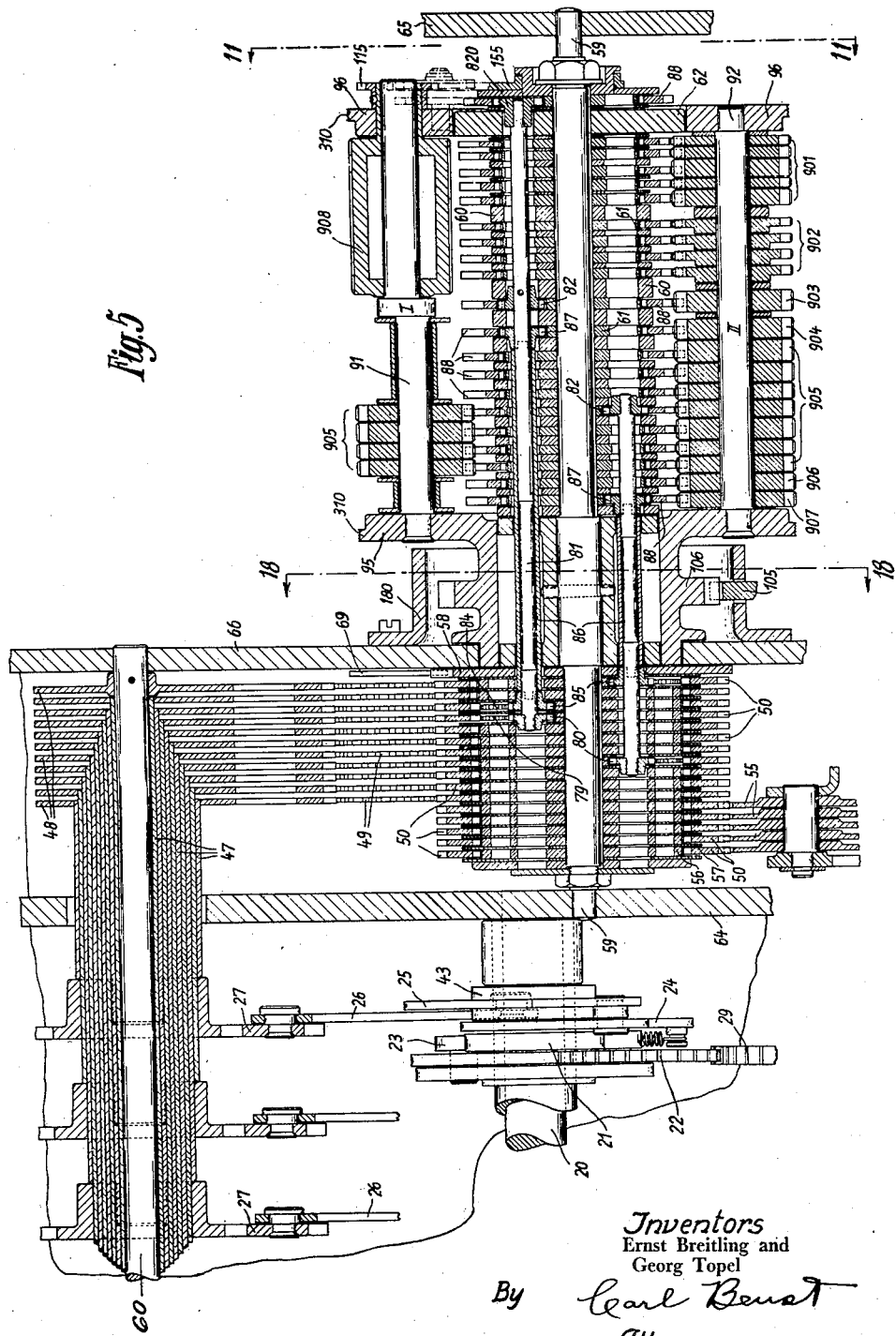

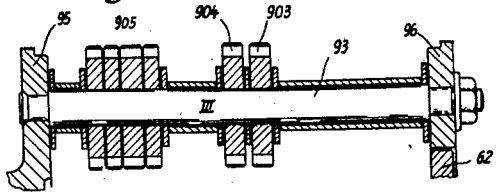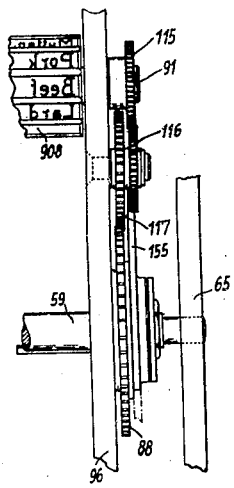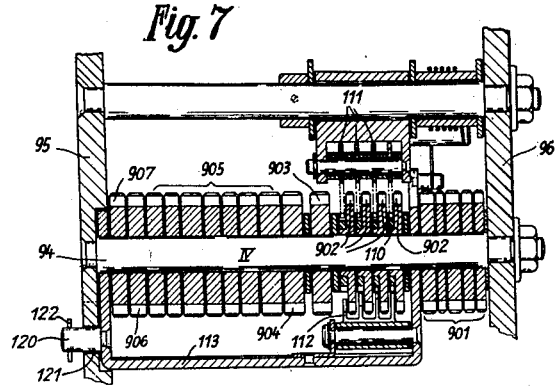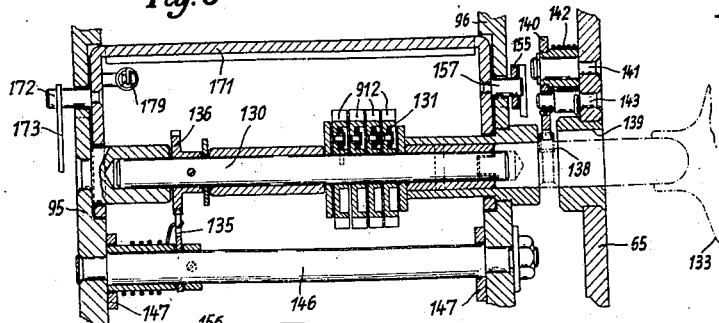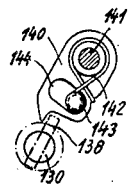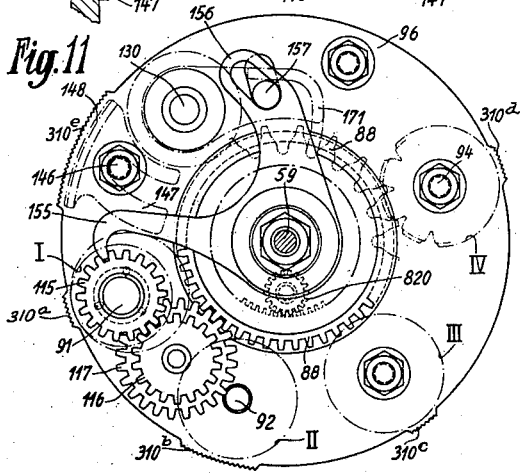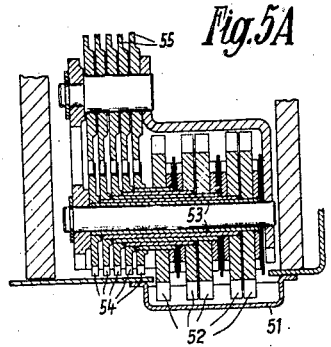
Inventors
Ernst Breitling and
Georg Topel
By Carl Benst
Their Attorney Inventors
Ernst Breitling and
Georg Topel
By Carl Beust
Their Attorney Aug. 6, 1940.  E. BREITLING ET AL  2,210,021
PRINTING MEANS FOR CASH REGISTERS, ACCOUNTING, AND THE LIKE MACHINES
Filed July 22, 1937  21 Sheets-Sheet 8

Inventors
Ernst Breitling and
Georg Topel
By Carl Benst
Their Attorney

Aug. 6, 1940.  E. BREITLING ET AL  2,210,021
PRINTING MEANS FOR CASH REGISTERS, ACCOUNTING, AND THE LIKE MACHINES
Filed July 22, 1937  21 Sheets-Sheet 9
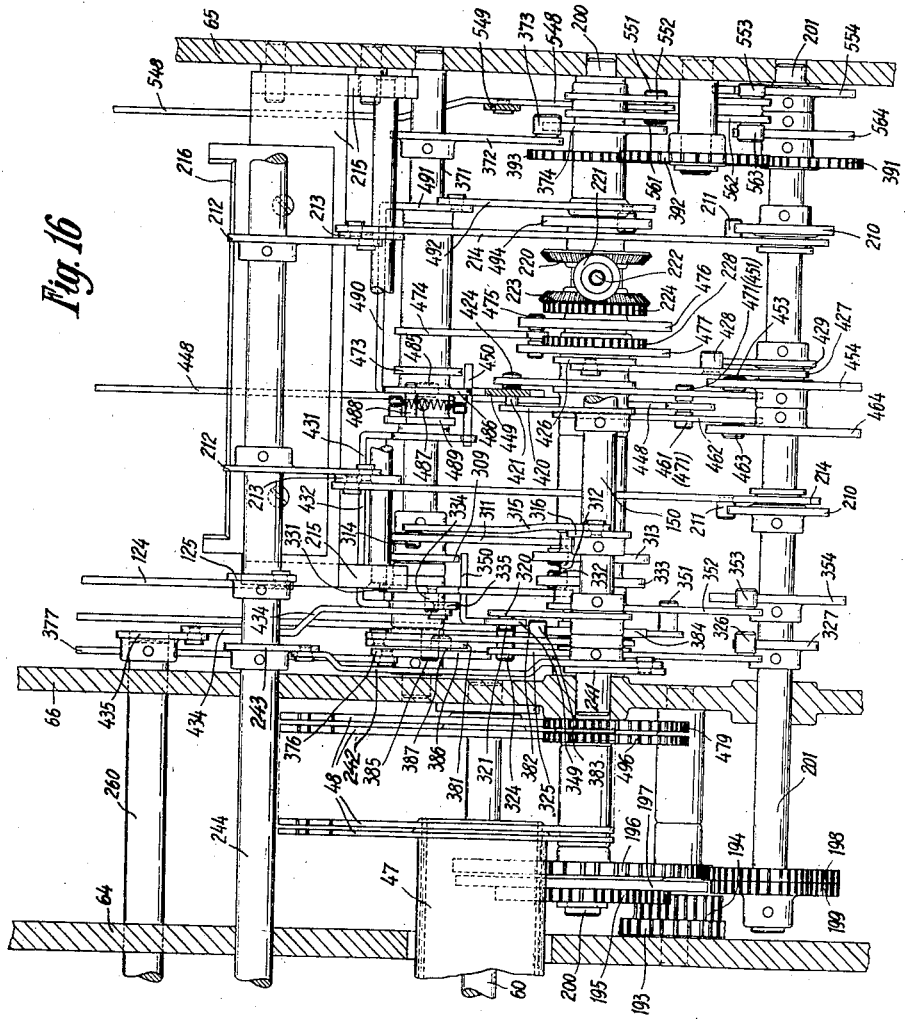
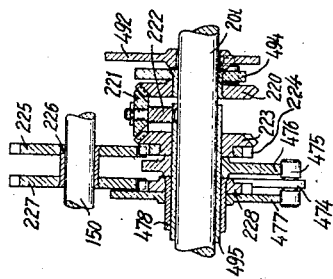
Inventors
Ernst Breitling and
Georg Topel
By Carl Beust
Their Attorney

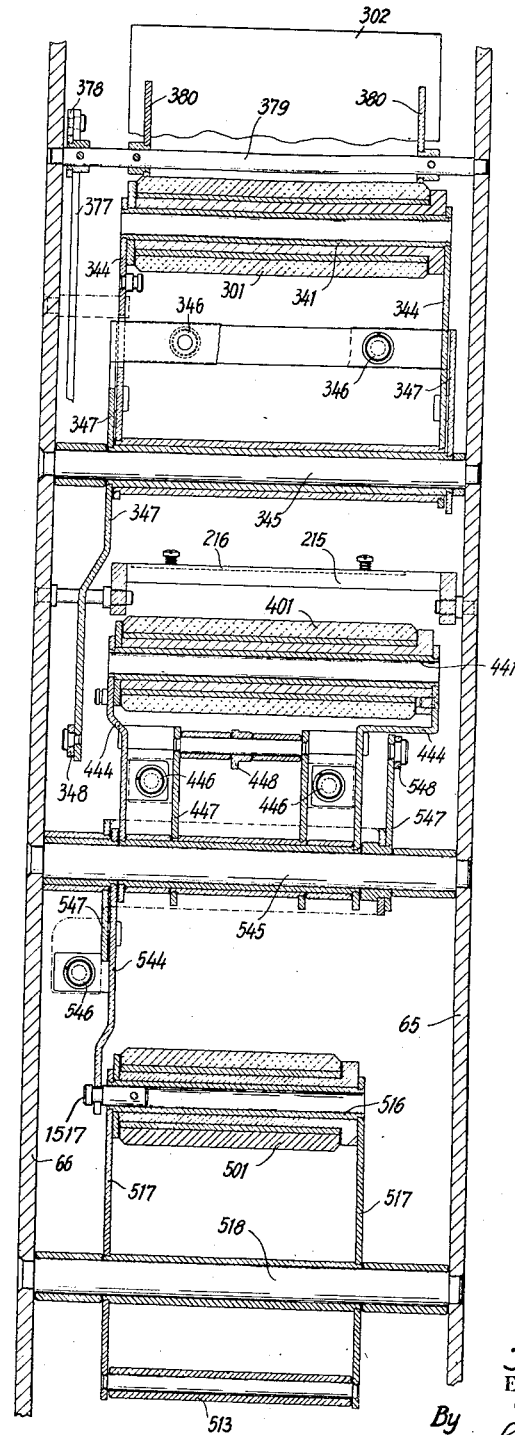

Aug. 6, 1940.  E. BREITLING ET AL  2,210,021
PRINTING MEANS FOR CASH REGISTERS, ACCOUNTING, AND THE LIKE MACHINES
Filed July 22, 1937   21 Sheets-Sheet 12

Inventors
Ernst Breitling and
Georg Topel.
By Carl Beust
Their Attorney

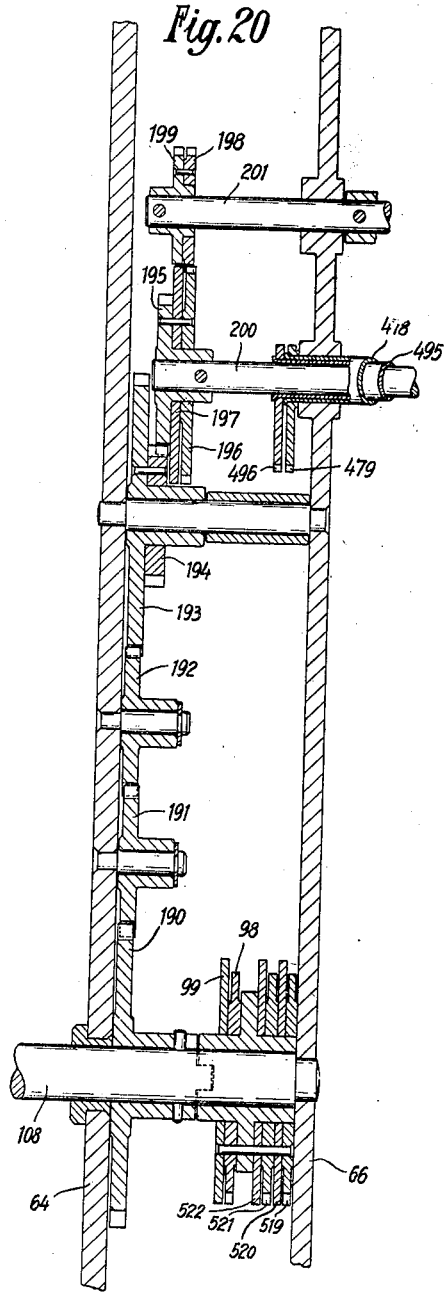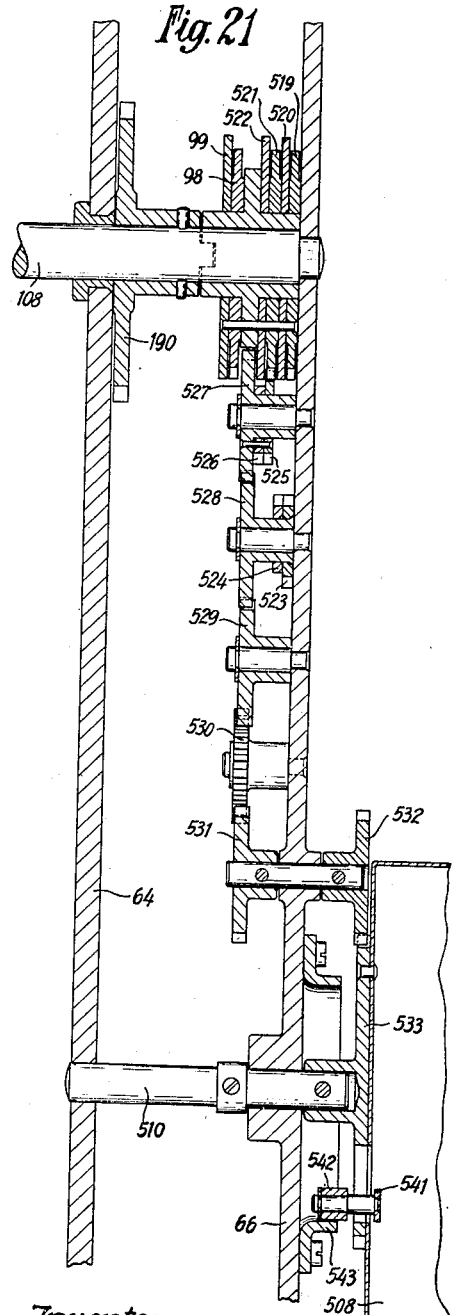

Aug. 6, 1940.  E. BREITLING ET AL  2,210,021

PRINTING MEANS FOR CASH REGISTERS, ACCOUNTING, AND THE LIKE MACHINES

Filed July 22, 1937  21 Sheets-Sheet 14

Inventors
Ernst Breitling and
Georg Topel
By Carl Benst
Their Attorney

Aug. 6, 1940.  E. BREITLING ET AL  2,210,021
PRINTING MEANS FOR CASH REGISTERS, ACCOUNTING, AND THE LIKE MACHINES
Filed July 22, 1937  21 Sheets-Sheet 16

Inventors
Ernst Breitling and
Georg Topel
By Carl Benst
Their Attorney

Aug. 6, 1940.   E. BREITLING ET AL   2,210,021
PRINTING MEANS FOR CASH REGISTERS, ACCOUNTING, AND THE LIKE MACHINES
Filed July 22, 1937   21 Sheets-Sheet 17

*Fig. 28*

```
                                    402
    Tom Miller
        Butcher
                                      ┐
Beef...................  *3.4 5     e │
                                    a │ L₁
19.MAR36  1234  R -*0003.45*       b │
                                      │
19.MAR36  1234  R -*0003.45*       d │
```

*Fig. 29*

```
                                    4021
    Tom Miller
        Butcher
                                      ┐
Pork..........   1 2.3 4            e │
Beef..........   *1.2 3             a │ L₂
Sausage ......   *2.1 2             a │ L₂
                                    a │
19.MAR36  1236 -  *0015.69*S        b │
                                      │
19.MAR36  1236 -  *0015.69*S        d │
```

*Fig. 30*

```
                                    4022
    Tom Miller
        Butcher
                                      ┐
                                    e │ L₃
19.MAR36  1240 -* 0036.14 -Z       b │
                                      │
19.MAR36  1240 -* 0036.14 -Z       d │
```

*Fig. 31*

| Clerk | Tom Miller | | |
|---|---|---|---|
| No 1 | Butcher | | |
| 1 | Beef | 2 | 10 |
| ¾ | Veal | 1 | 80 |
| 1½ | Pork | 3 | 20 |
|  | Sausage | 4 | 75 |
|  |  | 12 | 55 |
|  |  |  |  |

302₁

19.MAR36  1237 - *0012.55* BS
19.MAR36  1237 - *0012.55* BS

*Fig. 32*

| Clerk | Tom Miller | | |
|---|---|---|---|
| No 15 | Butcher | | |
| 1½ | Sausage | 1 | 10 |
|  |  |  |  |

302

19.MAR36  1238  W ~*0001.10* AS
19.MAR36  1238  W ~*0001.10* AS

*Fig. 33*

| Clerk | Tom Miller | | |
|---|---|---|---|
| No 8 | Butcher | | |
| 1 | Beef | 2 | 50 |
|  |  |  |  |

3022

19.MAR36  1235  R ~*0002.50* —
19.MAR36  1235  R ~*0002.50* —

*Inventors*
Ernst Breitling and
Georg Topel
By *Carl Benst*
Their *Attorney*

Inventors
Ernst Breitling and
Georg Topel
By Carl Benst
Their Attorney

Aug. 6, 1940.  E. BREITLING ET AL  2,210,021
PRINTING MEANS FOR CASH REGISTERS, ACCOUNTING, AND THE LIKE MACHINES
Filed July 22, 1937  21 Sheets-Sheet 19

Ernst Breitling and
Georg Topel
Inventors

By Carl Berst
Their Attorney

Aug. 6, 1940.  E. BREITLING ET AL  2,210,021

PRINTING MEANS FOR CASH REGISTERS, ACCOUNTING, AND THE LIKE MACHINES

Filed July 22, 1937  21 Sheets-Sheet 20

FIG. 45

| Name of Part. | 0 | 30 | 60 | 90 | 120 | 150 | 180 | 210 | 240 | 270 | 300 | 330 | 360 |
|---|---|---|---|---|---|---|---|---|---|---|---|---|---|
| Main Drive Shaft 108 | | | | | | | | | | | | | |
| Differential Device. | | | | | setting (set to zero) | | | | resetting (add) | tens transfer | | | |
| Totalizer engaging and disengaging device. | | | engaging | | | disengaging | engaging | | | | | disengaging | |
| Drive of Shafts 244 and 150. (only in single item entering and total taking.) | | | | forward | | | | | | | | return | |
| Consecutive number feeding. | | | | feeding | | | | | | | | return | |
| Type Wheel Setting. | | | | | setting | | | | | | | | |
| Type wheel locking bail 171 driven by cam disc 177. | releasing | | | | | | locking | | | | | | |
| Printing Drum shaft 59 drive. | | | | | | | | | | | | | |
| Printing Drum Locking Lever 69. (actuated by cam disc 77) | locking | | | | | releasing | | | | | | | |
| Check Strip Slackening Device 404-410. | straightening | | Slackening | | | | | | | | | | |
| Audit Strip Spool 508 Drive. (by means of parts 521-533.) | | | | forward movement | | | | | | back movement | | | |
| Audit Strip Line Spacing by parts 534-543. | | | | | | spacing | | | idle return movement | | | | |
| Printing Device Control Shaft 201. | | | | | | | 170 | | | | | | 350 |
| | 0 | 30 | 60 | 90 | 120 | 150 | 180 | 210 | 240 | 270 | 300 | 330 | 360 |
| (by cam disc 554 in connection with multiple items.) Audit Strip Roll Platen-501 | | | | | | | roll 501 with type wheel set III | | | | | | |
| (by cam disc 564 in connection with single-items and totals) | | | | | | | | roll 501 with set IV. | | | | | |
| Slip printing Roll Platen 301 driven by Cam disc.354. | | | | | | | | | roll 301 with set II | | roll 301 with set IV | | |
| (by cam disc 454 for amount printing. Check printing roll platen.401 | | | | | | | roll 401 with set I. | | | | | | |
| (by cam disc 464 for totals and electros. | | | | | | | | roll 401 with set II | | roll 401 with set IV | roll 401 with electro | | |
| Feeling Lever 38 actuated by Cam disc. 374. | | | | | | on | | | | | | | off |
| Check cutting Device 216 actuated by cam disc 210. | | | | | | | | | | | | | cutting |

Ernst Breitling and
Georg Topel
Inventors

By *Earl Beust*
Their Attorney

Aug. 6, 1940. E. BREITLING ET AL 2,210,021
PRINTING MEANS FOR CASH REGISTERS, ACCOUNTING, AND THE LIKE MACHINES
Filed July 22, 1937 21 Sheets-Sheet 21

Ernst Breitling and
Georg Topel
Inventors

By *Karl Benst*

Their Attorney

Patented Aug. 6, 1940

2,210,021

UNITED STATES PATENT OFFICE 2,210,021

PRINTING MEANS FOR CASH REGISTERS, ACCOUNTING, AND THE LIKE MACHINES

Ernst Breitling, Berlin-Tempelhof, and Georg Topel, Berlin-Reinickendorf, Germany, assignors to The National Cash Register Company, Dayton, Ohio, a corporation of Maryland Application July 22, 1937, Serial No. 154,980
In Germany July 23, 1936

39 Claims. (Cl. 101—92)

The invention relates to cash registers, accounting and the like machines and more particularly to a printing device such machines which are provided with a plurality of sets of type wheels cooperating with printing hammers to make imprints upon record material fed to the printing points. The strokes suddenly imparted to the printing hammers of such machines cause noise which is burdensome and annoying to the operator of the machine, especially when several machines are placed in the same room.

In some classes of ticket printing machines, a rotary printing drum is provided, having adjustable type carriers cooperating with revolving impression rollers. Such ticket printers do not provide for the variety of data printing necessary for recording the various transactions on the different kinds of record material usually issued by cash registers, accounting and the like machines.

Thus it is the main object of the invention to adapt a rotary printing device having a plurality of sets of type which co-operate with impression rollers, to meet printing conditions of cash registers, accounting and the like machines.

Another object of the invention is a novel arrangement of a rotary printing drum having adjustably secured thereto a plurality of type wheel sets for setting up data of different characters on the individual sets.

Another object of the invention is to provide novel means for adjusting maintaining the type wheel sets in adjusted position even during rotation of the printing drum.

Another object of the invention is to arrange novel means to control actuation of the impression rollers.

Another object of the invention is to adapt the impression roller control means to function differently under control of means operating to condition the machine for different kinds of operations, such as item entering and total taking operations.

Another object of the invention consists in the adaption of said impression roller control means for check issuing operations, and for printing on inserted slips, during multiple item entering operations.

Another object of the invention is to adapt the impression roller controlling means to cause the impression rollers to function differently during multiple item entering operations during which a check is issued, than during a multiple-item entering operation during which an inserted slip is printed upon.

Another object of the invention is to control the actuating means of the impression rollers to produce prints in duplicate on checks and slips, during single item entering, and multiple item total taking, operations.

A further object of the invention is to control the impression rollers for the audit strip to effect only one print during every operation of the machine.

Still another object of the invention is to control the impression rollers to feed and line space the check and audit strip.

Further objects of the invention will be pointed out in the following detailed description with reference to the annexed drawings.

A preferred form of an embodiment of the invention is shown in the annexed drawings.

Of said drawings:

Figure 1 shows the keyboard of the machine,

Figure 2 is a cross section through the machine taken alongside of an amount key bank showing the associated differential mechanism and totalizers, Figure 3 is a detail view in cross section taken through part of the type wheel adjusting mechanism adjacent the date setting wheels, Figure 4 is a view in cross section taken through the printing mechanism and includes the mechanism controlling for the audit strip printing means, Figure 4A is a detail view showing a portion of Fig. 4 in a larger scale, Figure 5 is a detail view in cross section of the printing drum and the type wheel adjusting device, taken along line 5—5 of Figs. 4 and 4A, Figure 5A is a view in cross section taken through the date setting wheels, Figure 6 is a view in cross section taken through a set of type wheels along line 6—6 of Figs. 4 and 4A, Figure 7 is a view in cross section taken through a set of type wheels along line 7—7 of Figs. 4 and 4A, Figure 8 is a view in cross section taken through the printing drum along line 8—8 of Figs. 4 and 4A, Figure 9 is a side detail view of certain elements of Fig. 8, Figure 10 is a view showing a portion of the printing drum and the adjusting mechanism for the word printing type elements, Figure 11 is a side view of the printing drum taken along line 11—11 of Fig. 5, Figure 12 is a sectional side view showing the control mechanism for the impression roller in the slip printing mechanism, Figure 13 is a further sectional side view of the mechanism of Fig. 12, Figure 14 is a sectional side view showing the mechanism for controlling the impression roller in the check printing device, Figure 15 is a detail sectional side view of the mechanism of Fig. 14, Figure 16 is a top view of the control mechanism of the impression rollers, Figure 16A is a sectional detail view of certain elements of Fig. 16, Figure 17 is a view in cross section taken through the impression roller bearings, taken along line 17—17 of Fig. 4, Figure 18 is a view in cross section taken through the printer drive mechanism along line 18—18 of Fig. 5, the interposed walls being omitted, Figure 19 is a view in cross section taken through the printer drum along line 19—19 of Fig. 18, Figure 20 is a view in cross section taken through the printer drum actuating mechanism, along line 20—20 of Fig. 18, Figure 21 is a view in cross section taken through the actuating mechanism for the audit strip feeding means along line 21—21 of Fig. 18, Figure 22 is a view in cross section taken through the actuating mechanism for the printing drum and type wheel locking means, taken along line 22—22 of Fig. 18, Figure 23 is a side view of an amount key bank, Figure 24 is a side view of a special key bank, Figure 25 is a side view of the actuating mechanism for the control shaft of the machine, Figure 26 is a view of the control shaft actuator as seen from the rear, Figure 27 shows a portion of the audit strip, Figure 28 shows a single-item check, Figure 29 shows a multiple-item check, Figure 30 shows a check printed during total taking operations, Figure 31 shows an itemized sales slip, Figure 32 is a receipt covering one item out of more items comprising a multiple-item transaction, Figure 33 is a single-item slip, Figures 34A and 34B is a perspective view of the whole control mechanism for the impression rollers.

Figure 45 is a time chart of the various trains of mechanism.

GENERAL DESCRIPTION

Figure 4:
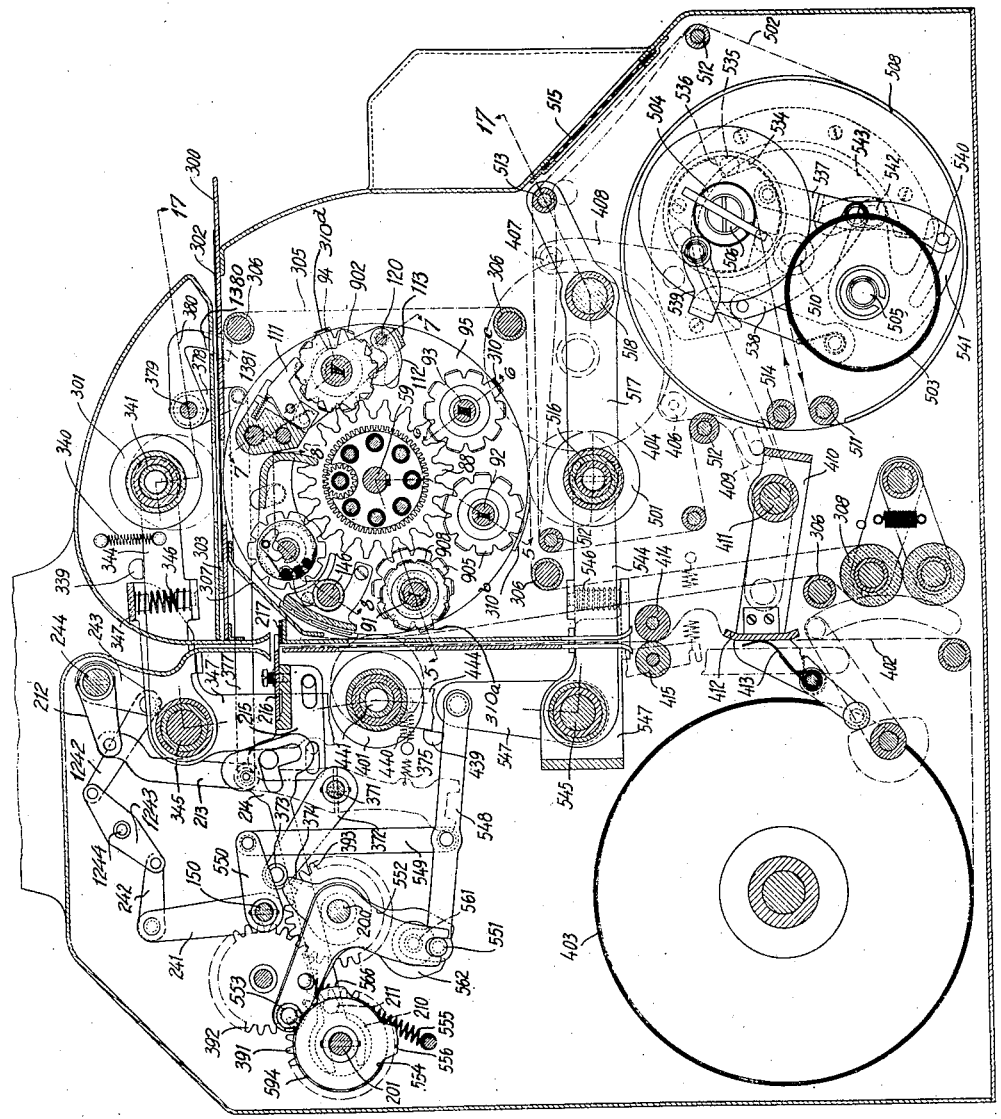

The invention is illustrated as applied to a cash register or accounting machine like that shown and described in the United States Patent No. 2,101,636 issued to Ernst Breitling and Hans Schwenk, on December 7, 1937, and which may be referred to for a more detailed description of such a machine. The machine illustrated herein is adapted for registering single-item transactions, multiple-item transactions, multiple-item totals, and totals, and for printing all the registrations effected on an audit strip and, selectively, on checks issued by the machine, and on a receipt (sales) slip insertable into the machine. For printing these three kinds of record media, a separate printing place is provided for each in the machine, where the different registrations are printed in different manners depending upon whether single-item transactions, multiple-item transactions, or totals are to be printed. In order to obtain printed records in the separate printing places, which records differ from each other in accordance with the mode of machine operation, a plurality of sets of type carriers are provided with varied type, said sets of type carriers being arranged within a drum so that they are adjusted simultaneously and, while the drum is rotating, the sets of type carriers are moved, after one another, through all the printing places, so that they effect, in accordance with the mode of machine operation, the prints, desired at the time, on the different record materials. Such result is obtained by controlling roller platens at the various printing places which are selectively urged towards said sets of type carriers. Therefore, the number of the prints possible during a machine operation is equal to the product of the number of printing points times the number of sets of type carriers in the printing drum.

During each printing operation, the cooperation of the rotating printing drum with the roller platens, which are pressed against said drum, causes the paper therebetween, at the slip and check printing places, and the ink ribbon to be fed, so that the printing and feeding of the record material and ink ribbon feeding are effected concurrently. Therefore, in regard to the check printing mechanism, it is not necessary, as will be clear from a description of this mechanism given later in the specification, to provide complicated mechanism to cause the check to be fed alternately a long or a short space, according to the nature of the machine operation, but this variable feed is controlled by the rotation of the printing drum.

The line-spacing of the audit strip is not controlled by the rotation of the printing drum, but independent means are provided for this purpose.

Keyboard of the register

In addition to amount key banks 10, there is provided a bank of commodity keys 11 having associated therewith two groups of totalizers comprising four and five totalizers respectively (S, R, F, H, and K, W, J, P, G) (see Figs. 1 and 2), a clerk key bank, comprising five lockable clerk keys 12 which have allotted thereto five totalizers (1, 2, 3, 4, 5); and a transaction key bank 13 (*—Cash, R—received on account, C—charge, A—paid out, NS—No sale or change) having a group of four totalizers associated therewith; key NS causes a printing operation only, but does not select a totalizer. A multiple-item totalizer or accumulator (Sa) is also mounted with the group of transaction totalizers and is selected whenever one of three multiple-item keys 14, 15 or 16 is depressed. One of these three keys is operated when a series of items, belonging to a multiple-item transaction, are to be entered. Key 14 is operated to control the machine for issuing an itemized check on which the items and the total thereof are printed. Keys 15 and 16 are provided to control the machine for multiple-item entries when sales slips are used, which are printed in a particular manner, as will be detailed hereinafter. In cooperation with the amount keys, the multiple-item keys 14, 15, 16 condition the machine for multiple-item transaction entering. The multiple-item keys 14, 15, 16, when operated alone, condition the machine for multiple-item total taking from the multiple-item totalizer or accumulator.

Total taking from the other totalizers is controlled by the operation of a lock 17 which conditions the machine for reading, or total taking.

Figure 24:
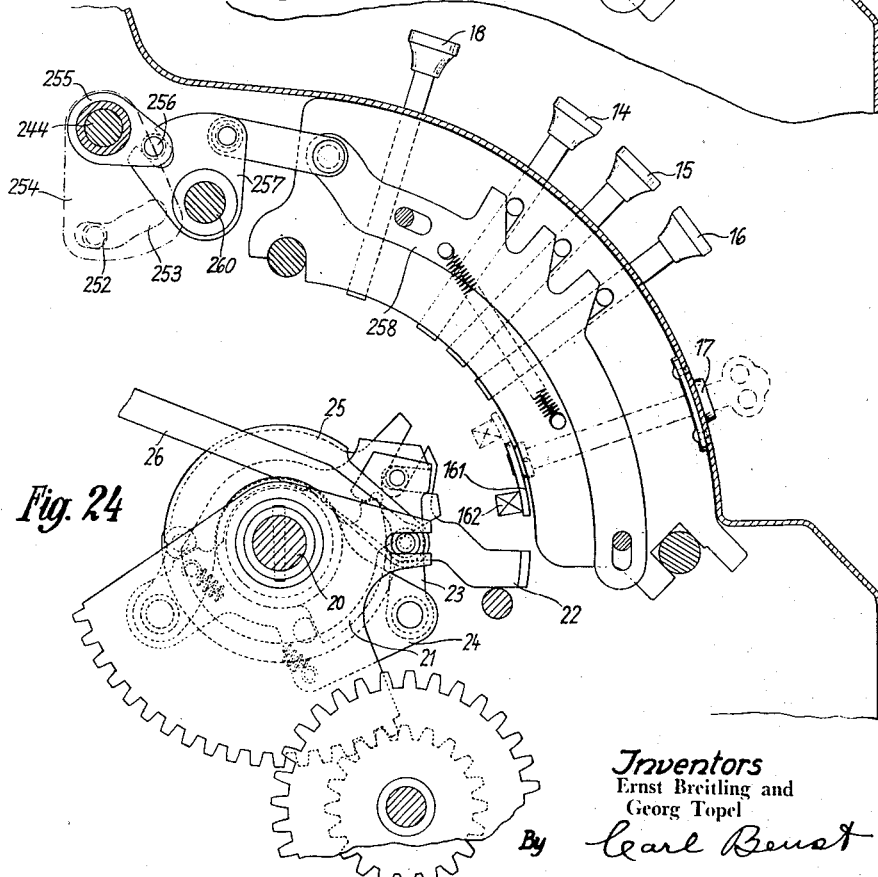

The barrel of the lock is provided with an arm 161 carrying a pin 162 (Figs. 1 and 24) cooperating with an element of the differential device associated with the multiple-item key bank. With the lock in normal position, as in adding operations, pin 162 is not in operative position, so that the differential element is held in zero position by means of a zero stop pawl, or is held by the key depressed in this row. If, however, the lock is set to "read" or "reset," pin 162 is moved into either the position "X" or "Z" to serve as stop for the associated differential device, so that either the printing character "X" or "Z" can be properly positioned.

Upon depressing a special "check-off" key 18, checks will not be issued in connection with single-item cash transactions, whereas, in connection with transactions of other character, checks are issued even though the "check-off" key is depressed.

The machine is released for each operation by depressing the motor bar 19.

For a more detailed description of a differential mechanism similar to that used in the present machine, as well as of the totalizer arrangement and engagement mechanism reference may be had to the above named Patent No. 2,101,636 of Ernst Breitling and Hans Schwenk.

*Differential mechanism*

Each amount key bank and each special key bank has associated therewith a differential device like that shown in the above-mentioned Patent No. 2,101,636 and comprises an actuator member 21 (Figs. 2 and 5) mounted on a shaft 20, a main differential member 22, a latch 23 and a latch carrying member 24, the latter being connected, by means of an arcuate lever 25 and a link 26, to a gear segment 27 serving as a means for adjusting the appropriate indicator and printing wheels. In each denominational order, a main gear wheel 29 interconnects each main differential member 22 with four intermediate wheels 30 selectively engaged by the corresponding denominational totalizer wheel 35 of the totalizer selected for operation, the various totalizer adding wheels being mounted on the shafts 31, 32, 33, 34.

The operation of the differential mechanism in one denominational order is briefly as follows:

During the upward movement of the actuator, the member 21, which is given an oscillatory movement, the parts 22, 23 and 24 are moved thereby until the main differential member is stopped, for instance by the stem of a depressed key. Thereby the parts 22, 23 and 24 are disengaged from the actuator 21 and are held in the adjusted position. During this standstill, the arcuate lever 25, linked to the latch carrying member 24, is urged towards the circumference of a hub 43 by means of a roller on a carrying lever 36 driven from the main shaft 108 through the parts 37 to 42. Due to this, by means of the link 26, the segment 27 is set in accordance with the value represented by the depressed key. The segment 27 is normally held by an aligning bar 46. The aligning bar 46 is withdrawn from engagement with the segment 27 at the commencement of the machine operation by means of a cam groove in disc 44 cooperating with a pitman 45. After the segment 27 has been adjusted to its new position, the aligner 46 reengages the segment and maintains it in such new position until the commencement of the next machine operation.

At the same time, the adding wheels 35 of the selected totalizers are brought into mesh with the wheels 30 by means of rocking the respective totalizer rows.

During the return movement of the actuator 21 the main differential member 22 is returned through a distance corresponding with that through which it was moved from home position, the amount commensurate therewith being transferred to the engaged adding wheels 35.

*Type wheel setting*

As mentioned above, the setting movement of the member 24 is transmitted to the associated segment 27. Each segment 27 is connected to a toothed segment 48 (Figures 3 and 5) by means of a hollow shaft, or tube, 47 supported by shaft 60, said segment in turn being geared through gear 49 to the outer gear teeth of a ring 50. Thus, a connection is constituted between each differential and each ring 50. In addition, each date wheel 52 is geared to a gear ring 50 by tubes 53 and gearing 54, 55.

All the gear rings 50 are rotatably mounted on discs 56 spaced from one another by thin discs 57, the diameters of which are greater than the diameters of discs 56. The discs 56 and 57 and, in addition, a locking disc 58, are secured to the left-hand portion of a shaft 59 rotatably mounted in side walls 64 and 65 so as to form a cylindrical body provided with annular grooves in which the gear rings 50 are rotatably guided. To the right hand portion of the shaft 59, there is secured a group of alternately arranged discs 60 and 61 of which the discs 60 are of greater diameter than the discs 61 and, in addition, a bearing plate 62, so that also this group of discs forms a cylindrical body provided with annular grooves in which gear rings 88 are rotatably guided.

Figure 18:
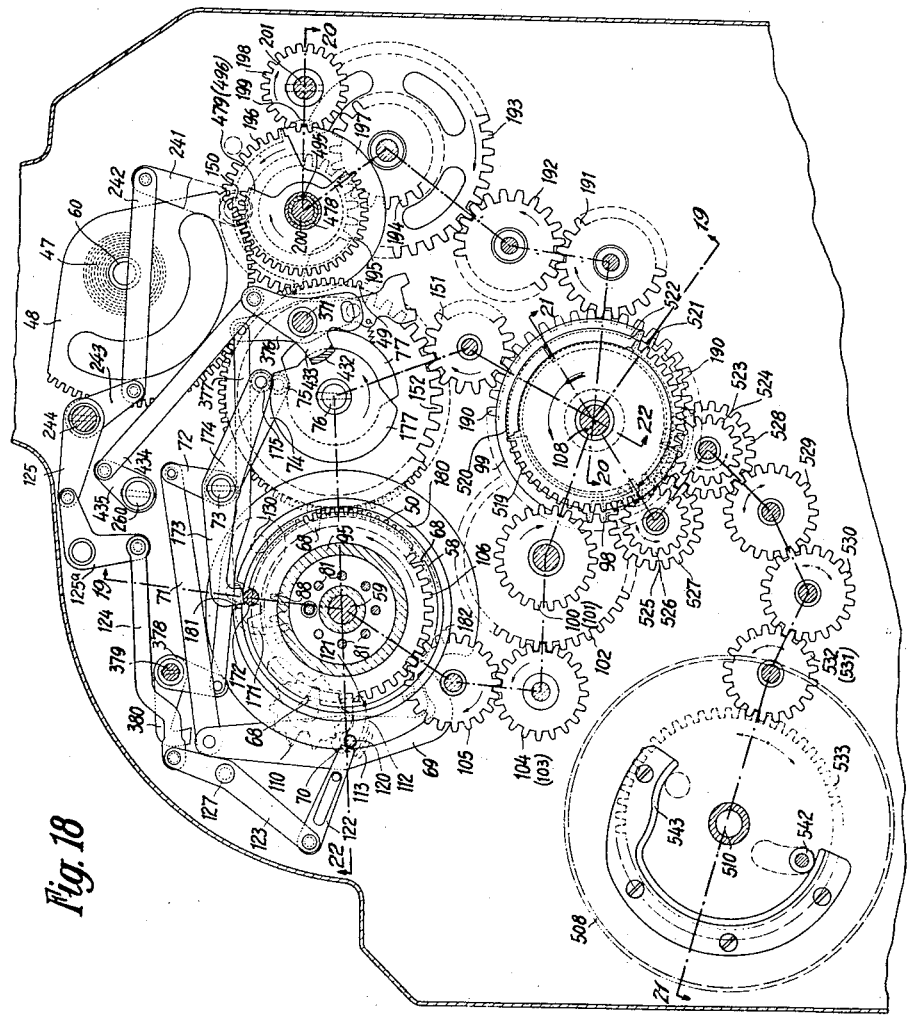
Figure 19:
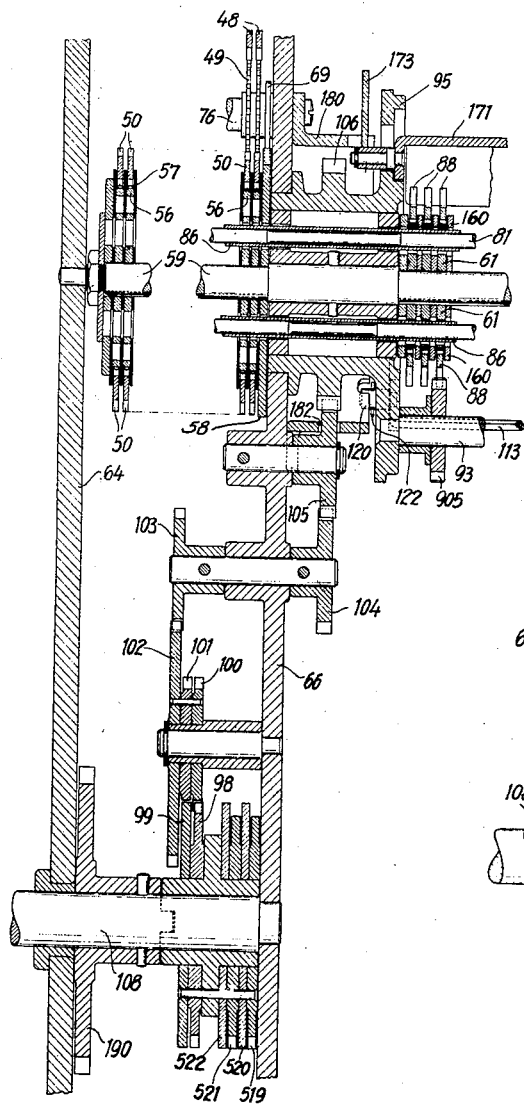
Figure 35:
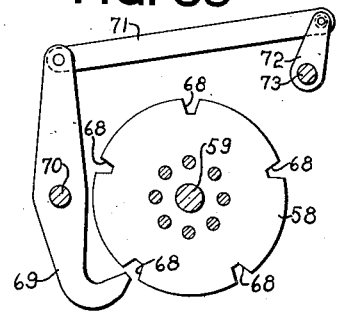
Figure 35 is a detail view of the mechanism for locking the printing drum core against rotation.
Figure 37:
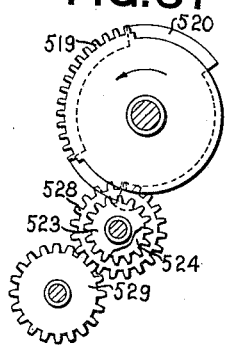
Figure 37 is a detail view of a part of the intermittent drive for the audit strip.
Figure 38:
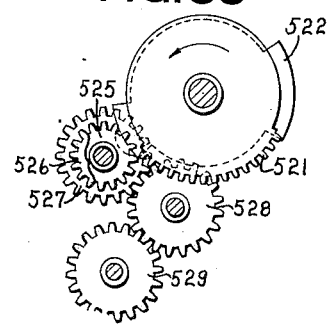
Figure 38 is a detail view of a part of the intermittent drive for the audit strip.

The shaft 59 and the two groups of discs 56—58 and 60—61 secured thereto, form the core of a printing drum which, in a manner about to be set forth, can be secured against rotation by a lever 69 engaging in one of the five recesses 68 of the disc 58 (Figs. 18, 19, and 35).

The two groups of discs of the printing drum core have eight bores, arranged in a circle concentric to shaft 59 and directly parallel to said shaft (see Figs. 3, 4, and 5). In each of the discs 56, one of the bores has such a diameter that a small gear 80 is permitted to rotate therein and, in addition to the eight bores, a recess is provided for a gear 79, of the same diameter as gear 80, to rotate therein. This latter recess is so arranged that the gear 79 is always in mesh with the gear 80 and with the interior teeth of the appropriate gear ring 50, the discs 57 maintaining the gears 79 in proper side space relation. The gears 80 are mounted on the ends of shafts 81 that pass through the respective bores of the two groups of discs and each of which carries a gear wheel 82 of the same diameter as the wheels 79 and 80 fast on its other end, each said gear wheel 82 fitting in an enlarged bore of a disc 61 and meshing with the interior gear teeth of the associated gear ring 88. Each shaft 81 supports a tube 86 carrying a gear wheel 85 fast to its left hand end, said wheel 85 being geared to the interior gear teeth of the appropriate gear ring 50 through a gear wheel 84 carried in the pertinent disc 56. Secured to the right hand end of each tube 86 is a pinion 87 meshing with the interior gear teeth of the appropriate gear 88. Thus each of the sixteen gear rings 50 is constantly geared to one of the gears 88.

The outer teeth of the gears 88 mesh with a plurality of type wheels (Figs. 4 and 5) rotatably mounted on four shafts 91, 92, 93 and 94 arranged parallel and with relation to shaft 59. The shafts 91 to 94 are supported in the front wall of a rotatable body 95 and in a ring 96 so that the parts 91 to 96 form a drum-like body. The rotatable body 95 serves as a means to support the said drum in a side wall 66, the ring 96 being mounted on the support or bearing plate 62. By means of an intermittent drive comprising gearing 98—106 (see Figs. 18 and 19), said drum is connected with the main drive shaft 108 of the machine, so that it remains in rest position during the first half of the machine operation but performs a full revolution during the second half of the machine operation.

Shaft 94 (Fig. 7) carries a complete set of type wheels 901—907 which, beginning from the right, comprises first, the date wheels 901, adjusted from the setting wheels 52, next a set of consecutive number wheels 902, each wheel having allotted thereto a ratchet wheel 110 (Figs. 4, 4a and 7) which cooperate, in well known manner, with locking pawls 111 and a stepped pawl 112, the latter being carried by a bail 113 with shaft 94 as a pivot and operated to advance the consecutive number as will be detailed hereinafter, and finally the type wheels 903, 904, 905, 906 and 907 for the commodity, clerk, amount, transaction, and the special bank and type of machine operation symbol. These wheels are adjusted in accordance with the value of the depressed key by means of the differential devices of the amount and special key banks through the parts 26, 27, 47, 48, 49, 50, 79, 80, 81, 82, 88 (Figs. 2 to 5).

The type wheel sets on shaft 92 (Fig. 5) comprise similar type wheels (901—907) which are similarly adjusted by means of the gears 88.

The shaft 93 (Fig. 6) carries only four settable type wheels 905 for the four denominational orders and the two type wheels 903, 904 associated with the commodity and clerk key banks. The type on these wheels is of a somewhat smaller size than that of the type on the wheels 92, 94 and may be cut differently so as to be distinguished clearly from that on the wheels on shafts 92 and 94.

*Word printing drum*

Further, shaft 91 (Fig. 4) carries the type wheels 905, assigned to the four lowest denominational orders and bearing small type, and a type drum 908 (Figs. 4, 5, and 10) mounted on an eccentric portion of said shaft and bearing nine words corresponding to the articles to be recorded in accordance with the commodity keys 11. The said drum comprises ten faces of which each of nine carries one of the words leaving blank only the face that is opposite the printing point when the drum is in normal position. The outwardly extending hub of said drum carries a gear 115 (Figs. 5 and 11) which, through companion gears 116, 117, is connected with the gear 88 arranged at the extreme right hand end of the printing drum. The interior teeth of this gear are engaged by a pinion 820 fast on the same shaft 81 which carries the pinion 82 for adjusting the type wheels 903, the said pinion being adjusted under control of the commodity keys 11. Due to this connection, the differential device associated with the commodity keys 11 causes one type wheel 903 of each of the type wheel sets on shafts 92, 93 and 94 to be set to the character classifying the article sold, and the type drum 908 on shaft 91 to the word naming the article sold.

To simplify the description, the sets of type carriers on shafts 91—94 are hereinafter referred to as printing type sets I, II, III, and IV.

*Advancing the consecutive number*

Fast on a bail 113 supporting a carrying pawl 112 serving as a means for advancing the number wheels 902, is a pin 120 (Figs. 4, 7, and 18) extending through a slot in the rotatable body 95 of the printing drum and into the path of a tripping pawl 122, linked to a lever 123 pivoted on stud 127 on the side wall 66. By means of a link 124 and bell crank 125a, the actuator lever 123 is connected to an arm 125 fast on a shaft 244. In a manner about to be described, this shaft 244 is moved only when single items are entered and when totals are taken. When this occurs, said shaft is rocked counter-clockwise through a certain angle during the first half of the machine operation and rocked back later on.

Upon the first movement of the shaft 244, the tripping pawl 122 (Fig. 18) is moved to the right, striking the pin 120, moving said pin to the left as viewed in Figs. 4 and 4a, and advancing the consecutive number by one unit, by means of carrying pawl 112. Since the consecutive number wheels 902 of the two printing type sets II and IV on shafts 92 and 94 are in engagement with the associated gears 88, the operated number wheels 902 of the two sets are uniformly advanced.

Mounted on a shaft 130 (Figs. 4, 4a, and 8) arranged within the printing drum, similar wheels 912 are provided in the plane of the consecutive number wheels which, like the consecutive number wheels 902, are set by the associated gears 88; wheels 912, however, bear no type. These wheels are provided with spring actuated pawls 131 bearing against the circumference of the shaft 130 provided with a groove 132. By means of a reset key 133 to be pushed in from outside, shaft 130 can be rotated in clockwise direction (Figs. 4 and 4a) whereby the wheels 912, in a well known manner, by means of the cooperation of the groove 132 and the pawls 131, are restored to zero position. At this time, by means of the gears 88, the number wheels 902 are reset.

A locking pawl 135 (Figs. 4a and 8), cooperating with a locking wheel 136 fast on a shaft 130, prevents the inserted key from being turned back, whereas a pin 138 on the said key and a groove 139, provided in the aperture in the side wall through which said key is inserted, permits said key to be withdrawn only with the shaft 130 in zero position.

As it is impossible for the operator of the machine to see from outside when, during resetting the number wheels, the zero position is reached, that is, when the key has completed a revolution, a special locking mechanism is incorporated which arrests the said key after a full revolution. This locking mechanism consists of a pawl 140 (Figs. 8 and 9) pivoted on stud 141 on the side wall 65 and urged by a spring 142 towards a stationary pin 143. The pawl 140 lies in the plane of the pin 138 and is so shaped that, when in rest position, it permits the insertion and turning of the key 133 in clockwise direction. At the end of the rotation of said key, pin 138 rocks the pawl 140 until the end of the slot 144 strikes the stationary pin 143 and prevents a further movement of the pawl 140 and, in connection therewith, also of the key 133. Only after the key is withdrawn does the pawl 140 become able to return to normal position again, thus finishing the resetting of the number wheels.

On a shaft 146 is provided a holding means 147 suitable for affixing thereto an electro 148 with stereotyped data (for instance the name of a firm, etc.).

Locking the printing drum

While the type wheels are adjusted as set forth above, both the core of the printing drum secured to shaft 59 and the printing drum proper carrying the type sets I to IV must remain at rest. To this end, shaft 59 has fixed thereto the locking disc 58 previously mentioned (Figs. 5, 18, and 35). The disc 58 is provided with five recesses 68, one thereof, with the machine in rest position always lying opposite a locking lever 69 pivoted on a stud 70 on the side wall 66. By a link 71, the locking lever is connected to a lever 72 fast on stub shaft 73 journaled in the side wall 66. Fast on said shaft 73 is also another lever 74 having a roller 75 riding on the circumference of a cam disc 77 fast on shaft 76. During each machine operation through the gearing 190, 151, 152, the disc 77 is given a full revolution, the circumference of said disc being shaped so that by means of the locking lever 69 and the disc 58 it locks the printing drum core immediately after the start of the machine operation and holds it locked until after adjustment of the type wheels is terminated, that is, nearly in the middle of the machine operation.

During this time the printing drum is also held locked by means of the cooperation of the locking disc 99 with a gap provided on wheel 101 (Figs. 18, 19, and 36) of the drive 98—106, which wheel gives the printing drum a full rotation during the second half of each machine operation.

Locking the type wheels

Figure 22:
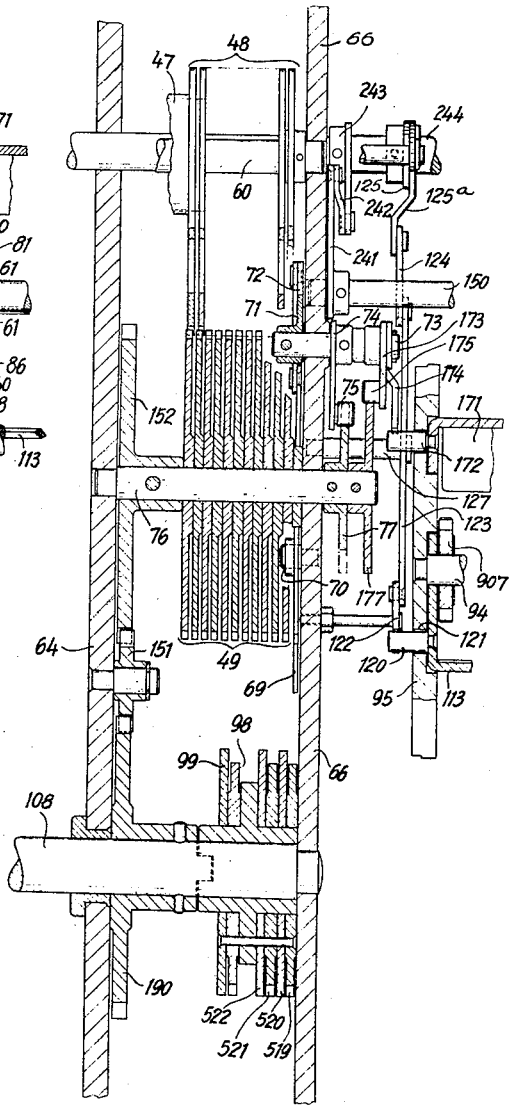

Mounted on the reset shaft 130 is a bail 171 provided with a locking edge which extends along the type wheel setting gears 88, and which is able to engage in the deep gaps between the outer teeth of the gears 88 (Figs. 4, 4a, 8, 18). At its left hand side, the bail carries a roller 172 extending through a slot in the rotatable body 95 into the path of a lever 173 mounted on stud 73 and having an arm 174 (Figs. 18, 22) carrying a roller 175 riding on the circumference of a disc 177 fast on the shaft 76. The circumferential surface of the said disc is shaped so that the lever 173, with the machine in rest position, presses upon the pin 172 by projecting through a gap 181 in a flange 180 carried by the side wall 66, thereby holding the locking bail 171 in its locking position against the action of spring 179 (Fig. 8), but releasing it immediately at the start of the machine operation, so that the gears 88 are free to adjust the type wheels. At about 160° to 180° of the cycle of the machine operation, the locking bail 171 is reengaged to keep the type wheels locked in their new positions. If now the printing drum is turned, the roller 172 moves from under the lever 173 and cannot return under the action of spring 179, but is held against return by means of the flange 180, said roller riding along the inner circumferential surface of the flange until, after the printing drum has completed its revolution, said roller is again opposite the gap 181 and moves therein under the action of spring 179.

Locking the word printing drum

The word printing drum 908 is mounted on the eccentric portion of shaft 91 (Figs. 5 and 11) to prevent said drum from contacting with the gears 88 which adjust the date and consecutive number wheels provided within this space and is driven as described above, through the gears 115—117. Any one of the gaps between the teeth of the gear 115 is engaged by a locking lever 155 rotatable about shaft 59. An inclined slot 156 in another arm of the locking lever is engaged by a stud 157 secured to the type locking bail 171 and extending through a hole 158 in the collar 96. By reason of this connection, the word printing drum 908 is locked and released at the same time as the other type wheels are locked and released respectively.

Printing drum drive

Figure 36:
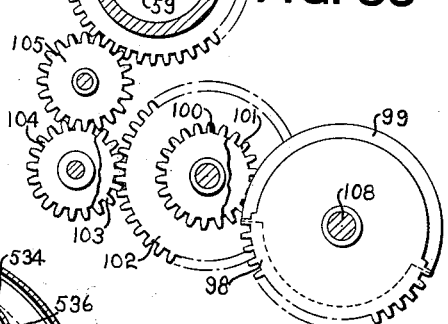
Figure 36 is a detail view of the intermittent drive mechanism for rotating the printing drum.

As mentioned above, the printing drum is given a revolution in the second half of the machine operation, by means of gearing 98—106 (Figs. 18, 19 and 36). The gear 106, connected to the rotary disc 95, meshes with a gear 105 through an aperture 182 in the flange 180, gear 105 being in connection with a twin wheel 100, 101 through gearing 104, 103, 102. The toothed wheel 100 has a gear-toothed segment 98 opposite thereto, which does not engage the wheel 100 with the machine in its position of rest. The gear 101 has a gap formed therein and is opposite a locking disc 99, the locking surface thereof, when in rest position, engaging in the recess in the wheel 101 thus securing the printing drum against rotation through the gears 101—106. The gear segment 98 and the locking disc 99 are fixed to the drive shaft 108, thus performing one revolution in each machine operation. The locking surface 99 and the gear segment 98 are shaped and the ratio of gear is selected so that the series of gears and, in connection therewith, also the printing drum remain stationary in the first half of the machine operation, while, in the second half, said drum performs a revolution.

As the type wheels, which are held locked during the rotation of the printing drum, are in mesh with the gears 88, and the gears 50 are connected to the adjusting gears 27 which are held locked at the time, whereby the gears 50 also are locked, the parts, arranged in between the stationary gears 50 and the revolving gears 88, must be able to accomplish a compensating movement. This is rendered possible by the arrangement of intermediate wheels 79 operating as planetary wheels.

When, during rotation of the printing drum, the gears 88 are moved they rotate the pinions 82 and 87 and, by means of the shafts 81 and tubes 86, respectively, the pinions 80 and 85 which, in turn, rotate the pinions 79 and 84. At this time, the latter engaging the inner teeth of the stationary gears 50 cause the core comprising the rigidly interconnected parts 56—62, of the printing drum to rotate in the same direction as does the printing drum. However, the rotation of the core is only two fifths of that of the drum which is due to the ratio of the gears selected. The printing drum having completed its revolution, its core with the disc 58 is turned again to such an extent that one of the recesses 68 is opposite the nose of the locking lever 69 which enables the core to be locked again for another type wheel adjusting operation.

*Arrangement of the printing points*

After the type wheels have been adjusted and then locked, the printing drum is rotated as described before, all the type sets passing through all the printing points. In each of the three printing places, where the audit strip, the check and an inserted slip are to be printed, a roller platen 301, 401, 501 is provided (Figs. 4 and 4a) each of which is actuated and controlled, in a manner about to be described, to the effect that it is either moved toward the circumference of the rotating printing drum or lifted away therefrom depending on the mode of machine operation, so that it causes a print on the paper lying positioned between the printing drum and the platen, a print being effected by one, the other or more, of the type sets or no print at all being taken.

*Slip printing point*

The upper printing place, where the roller platen 301 (Figs. 4 and 4a) is arranged, is provided for printing a slip 302 which may be placed from the outside on a printing table and moved in until it contacts a stationary abutment 303.

An inking ribbon 305 runs between the printing drum and the roller platen and is guided over rolls 306 and a guide plate 307 and is inked from an inking roll 308 under the action of a spring.

The outer circumferential surfaces of the rotatable body 95 carrying the printing drum and the ring 96 have knurled surfaces 310 (see also Fig. 11) adjacent the type sets, the knurled surfaces being arranged flush with the adjusted type. Now, if a roller platen is to cooperate with any type set, it will be lowered so far that, normally, it will not cooperate with the circumference of the members 95, 96 of the printing drum, but only with the outstanding knurled surfaces 310 a, b, c, d associated with the operative type set or sets, the paper lying therebetween being fed by the knurled portion, as the roller platen roll rolls upon its axis, thus causing a print to be effected by the revolving sets of type carriers.

*Check printing point*

Figure 34A:
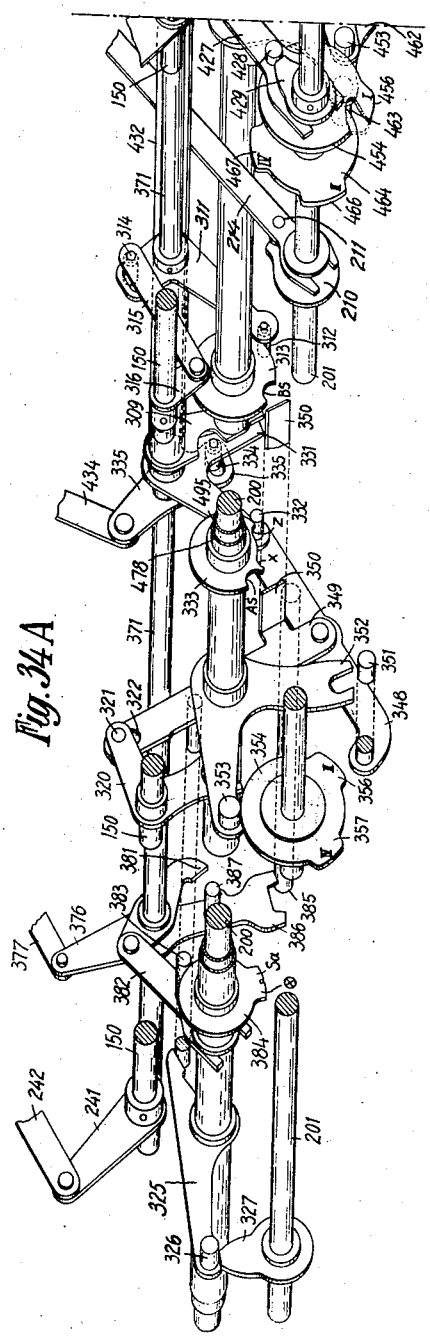
Figure 34B:
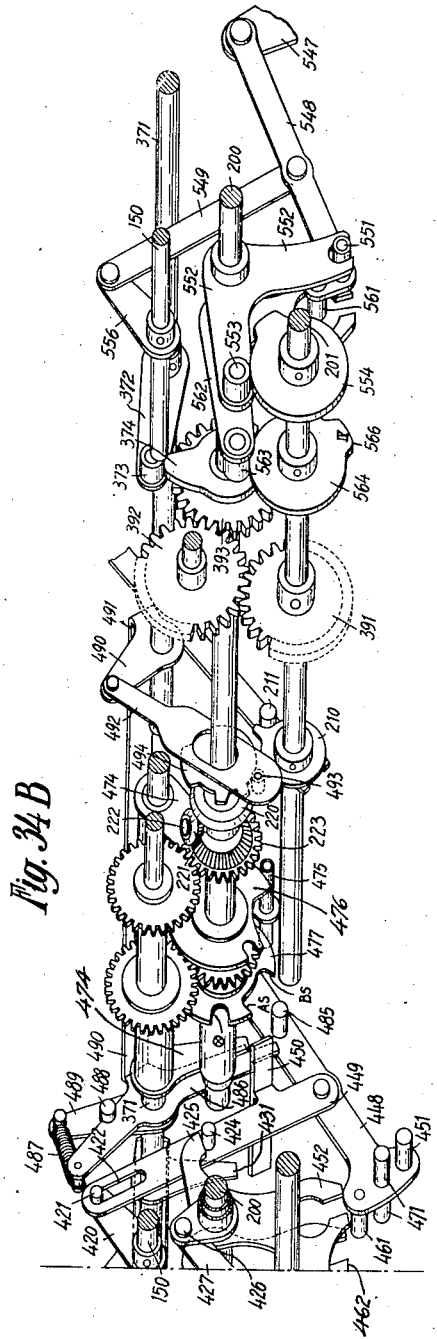

The same operation is repeated when the roller platen 401 for the purpose of printing a check is moved towards one of the sets of type carriers or the electro 148. However, the check strip 402 is not wound directly from the supply roll 403 but a sufficient piece is used of the slackened portion of the paper strip, the slackening of the strip being caused beforehand by a special mechanism pulling a certain length of the check strip from the supply roll. This mechanism consists substantially of a bail 410 given a reciprocatory movement by means of a pair of cams 404—404' (see also Fig. 42) which are given a complete rotation during each machine operation by suitable gearing connected to the main drive shaft 108. Coacting with the cams 404—404' is an arm 408 which is pivoted on a stud in frame 64 and which carries rollers 406 and 407 coacting with the cams 404—404'. The arm 408 is connected to an arm 409 by a pin-and-slot connection, said arm 409 being connected to bail 410 by a pin-and-slot connection. The bail is mounted on an eccentric pivot 411. The extent of the reciprocating movement of the bail 410 can be increased or decreased within certain limits by means of displacing the eccentric pivot 411. The check strip is led between a bridge 412 and a spring loaded flap 413 of the actuator bail 410, and then between two upper rolls 414, 415 urged together under adequate pressure, whence the strip is moved through the printing point to the knives 216, 217 of the cutting mechanism 210—217 (Figs. 4 and 34B).

Figure 42:
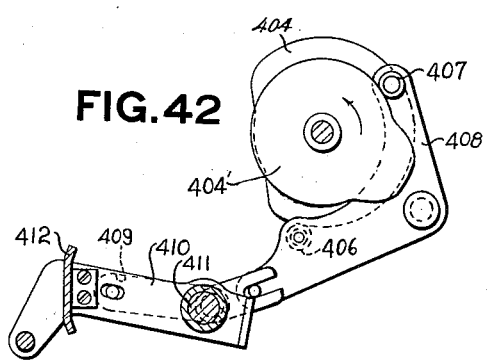
Figure 42 is a detail view of a part of the check paper slackening mechanism.

At the commencement of a machine operation, the bridge 412 of the bail 410 is in its upper position (Figs. 4 and 42). At this time, the slack portion of the check strip not used during the previous machine operation forms a loop which is located between the bridge 412 and the flap 413 on one side and the pressure rolls 414 and 415 on the other side. When the bail 410 is moved into its lower position by the cam discs 404, 404', the flap 413 causes the strip 402 also to be moved downwardly until the strip is stretched taut and thereafter the bail 410 moves still further downwardly. During this continued movement of the bail 410, the strip is not pulled any further downwardly, but the slack portion remaining is formed into a loop which lies below the flaps 413. When the bail 410 moves upwardly under the influence of the cam discs 404, 404', the loop of strip 402 which was lying below the flap 413 is tautened, and, in addition, an extra length of strip is pulled off from the roll 403 by the bridge 412 and flap 413 to provide the necessary length of strip for the next operation, this additional length of feed being determined by the adjustment of the eccentric 411 and forming a loop between the bail 412 and the pressure rolls 414 and 415.

The appropriate line-spacing of the check strip 402 is effected by the feed surfaces 310a, 310b, 310d, 310e (Fig. 4), which cooperate with the paper when their appropriate printing type sets I, II, and IV and the electro 148 are operated. The feed surfaces 310, of which one or more are active in accordance with the type of machine operation performed, feed the check strip to a variable extent by cooperating with the roller platen 401.

The greatest extent of feed required, during a single machine operation, is in respect of a single item check, for which the type wheel sets I, II, and IV and the electro cooperate with the roller platen 401 and in this particular type of machine operation the feed surfaces 310 act to feed the check a length L', which equals a plus b plus d plus e (Fig. 28). The upper loop formed, as above explained, is of such an extent that this length L' can be taken up by the feeding surfaces 310 without taking up the whole of the slack formed by the loop.

When the first item of a multiple-item transaction is printed, the check strip 402 is fed by feed surface 310a to a length Lea (Fig. 29), so that only this portion is taken from the loop. During each succeeding item entry, a feed of Lea will be given to the check strip equally to space the items thereon. When type set II cooperates with the roller platen 401, the feed surface 310b will space the strip 402 to a greater extent than feed surface 310a in order to space the first total print well away from the last item. This surface 310b will also space the strip after the print of the first total in order to provide a clearance for a perforation to be made between this latter print and the second total print to be made from type set IV. Feed surface 310c insures the necessary space between the print from the electro 148 and the first item.

*Audit strip printing point*

In the third printing place the audit strip 502 is printed, the supply and the storage spools 503—504 being supported by studs 505, 506 of a drum 508 (Figs. 4 and 21) rigidly connected to a gear wheel 533 fast on shaft 510.

The audit strip runs from the supply spool 503 over the guide rollers 511, 512, 513, 514 to the storage spool 504. The guide rollers 512 are stationary, while the two guide rollers 511, 514 are secured to the drum 508 which, in each machine operation, is first rocked counter-clockwise (Fig. 4), and then returned clockwise through equal angles before and after printing, respectively, by means of an intermittent gearing 521—533 (Figs. 18, 21, 37, and 38). By this rotation of the drum 508, the audit strip is moved so that the last line printed is moved away from the position visible through a window 515 to the printing point and thereafter the last line printed is moved to the position where it is visible through the window.

Figure 44:
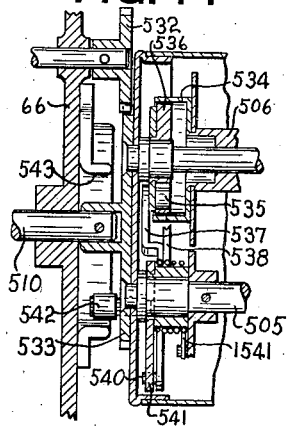
Figure 44 is a side view, in cross section, of the mechanism shown in Fig. 43.
Figure 43:
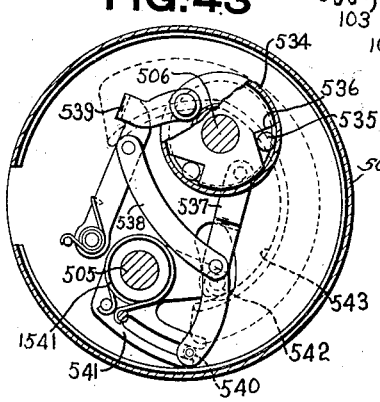
Figure 43 is a detail view of the audit strip feed mechanism.
Figure 46:
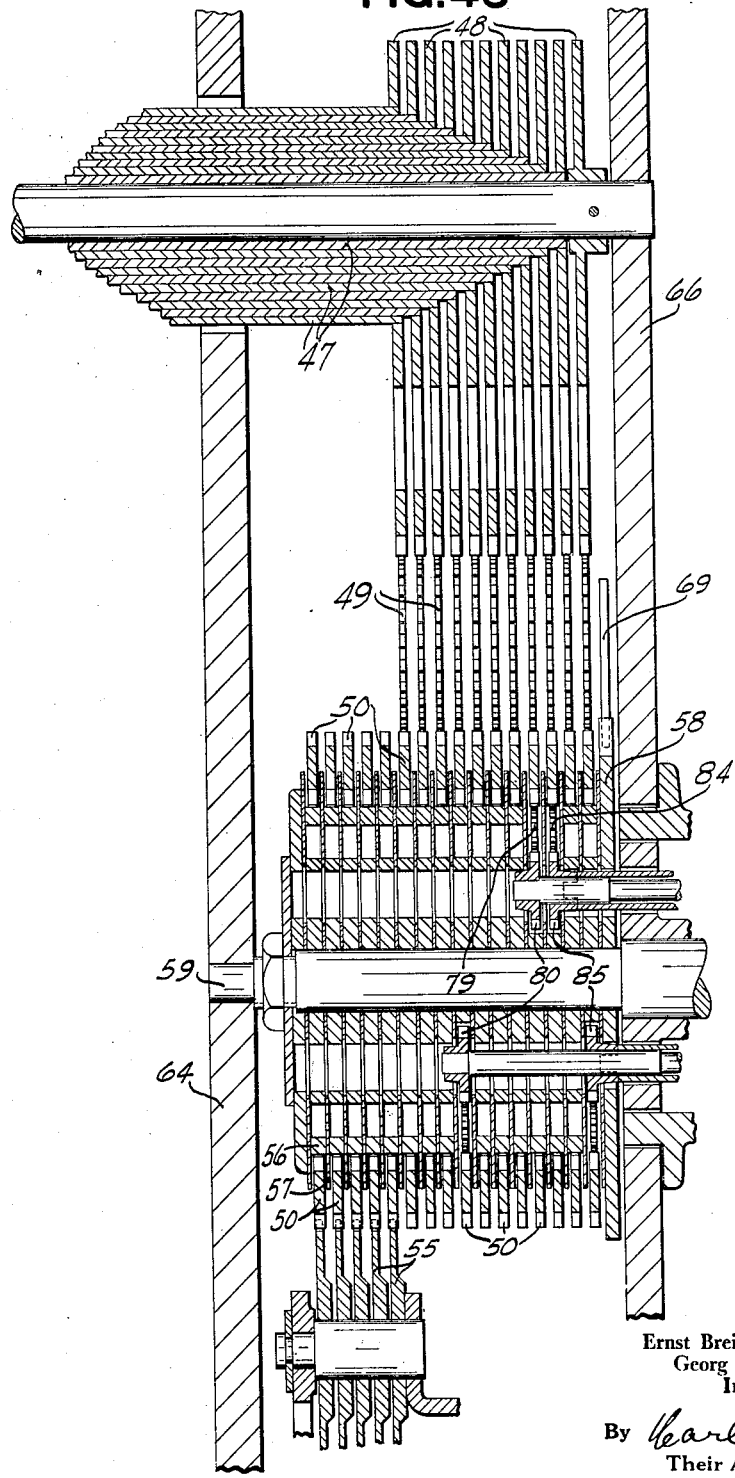
Figure 46 is an enlarged detail view of the type wheel adjusting gears shown in Fig. 5.

For the purpose of line spacing, the audit strip is given an additional movement by means of turning the storage spool 504 (Fig. 4) accordingly. To this end the storage spool 504 (see also Figs. 43 and 44) is provided with a friction coupling consisting of parts 534—536, part 536 thereof having connected thereto a link 537 connected to a feeler lever 539 attached to drum 508, by means of a link 538. The feeler lever 539 carries a roller bearing under the action of a spring against the circumference of the storage spool 504, so that it is rocked to the left, when the diameter of said spool increases, and carries along the link 537, due to which a pin 540 thereof is displaced within a slot of an angular lever 541 pivoted at 505. A roller 542 of the arm of the angular lever 541 engages the inside surface of a curved plate 543 fixed to the side wall 66. While the drum 508 rotates, the roller 542 rolls along the inside surface of the curved plate 543 and is rocked in counter-clockwise direction due to the shape of said surface, whereby through the link 537 and the friction coupling 534—536, the storage spool 504 is turned by a line space to feed the audit strip. By reason of the connection of the link 537 to the feeler lever 539 the effective length of the one arm of the angular lever 541 is changed in accordance with the increasing diameter of the storage spool so that the audit strip is always fed by one and the same line space. While the drum 508 is turned back, the angular lever 541 and the link 537 return to their initial positions under action of a spring 1541 coiled around the hub of spool 505, one end being fastened to the flange of the spool and the other end being fastened to lever 541. This movement of the link 537, however, is not effective since the friction coupling 534—536 is not operative in this direction.

*Printer shaft drive*

The roller platens 301, 401 and 501 are moved into and out of engagement with the printing drum by mechanism actuated from the shaft 201, which is driven in a manner about to be described. The main drive shaft 108 is connected to the shaft 201 by means of an intermittent gearing 190—199 (Figs. 18 and 20) in such a manner that shaft 201 (Figs. 4, 12, 14, and 18) is held during the first half of the machine operation, but given a full revolution in counter-clockwise direction as viewed in Figs. 4, 12, and 14, but clockwise as viewed in Fig. 18, during the second half of the machine operation.

Shaft 150 also controls the roller platens 301, 401 and 501, which shaft, in a manner about to be described, is rotated clockwise (Fig. 18) and counter-clockwise (Fig. 4) through a certain angle in the first half of a machine operation, and turned back at the end of the machine operations for entering single amounts and total taking.

Figure 25:
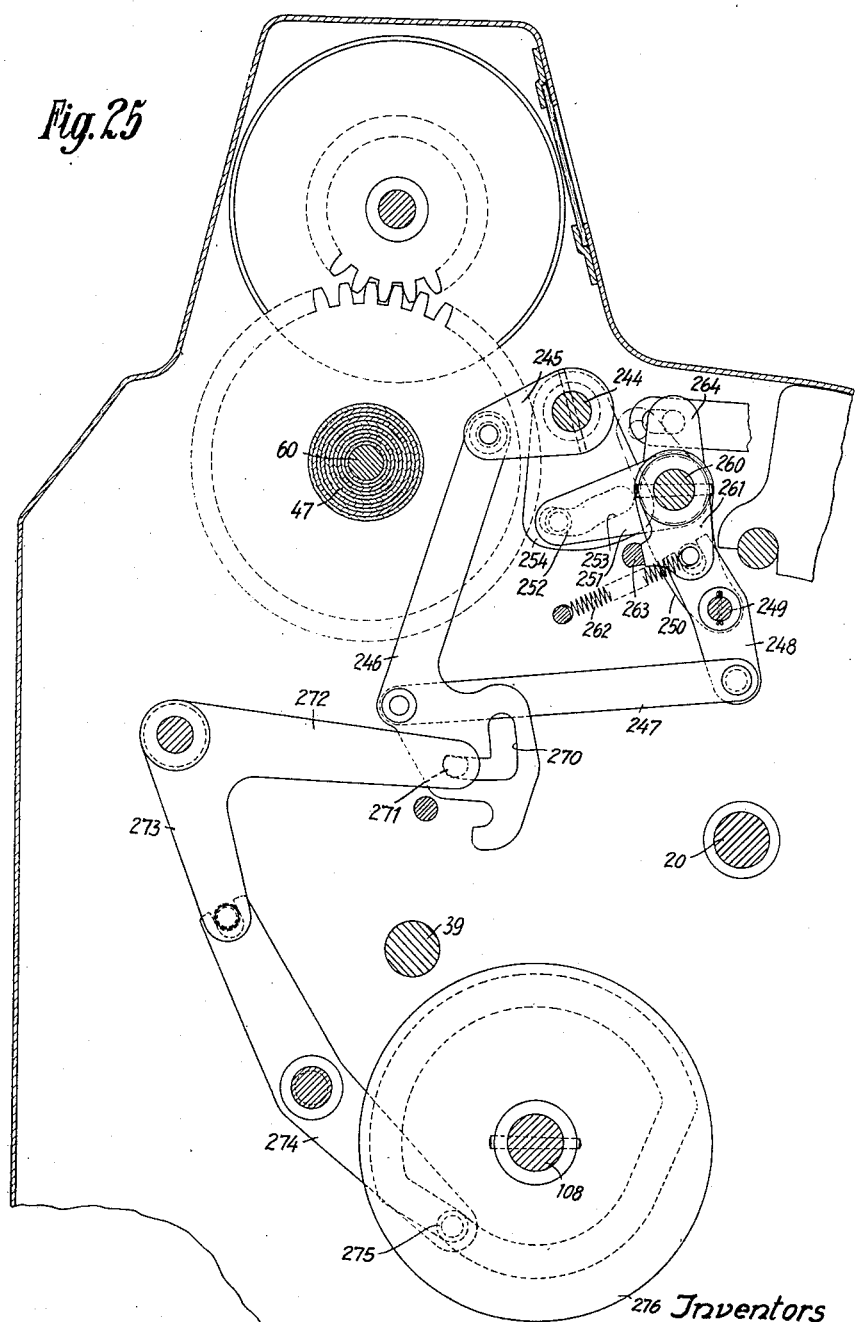
Figure 26:
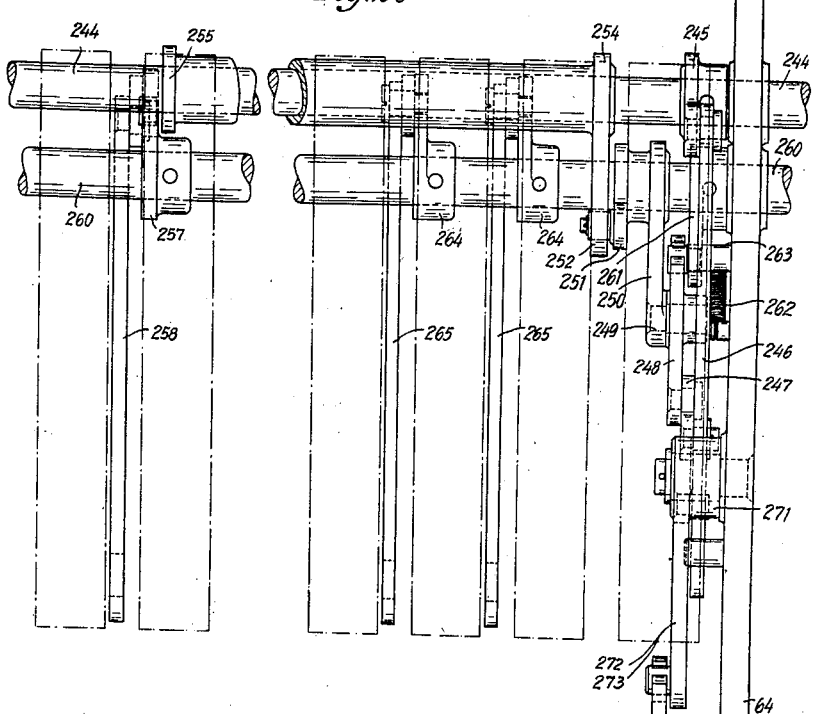

By means of a system of levers 241, 242, 1243, 1242, and 243, the shaft 150 is connected to a shaft 244 (Figs. 4 and 18) carrying an arm 245 (Figs. 25, 26). The latter has linked thereto a pitman 246 connected to a two-armed lever 248 by a link 247. Said two-armed lever is pivoted on stud 249 of a lever 250 mounted on shaft 260 and rigidly connected to an arm 251. A pin 252 of said arm 251 slides within a curved slot 253 of a lever 254 mounted on shaft 244 and rigidly connected to an arm 255 (Fig. 24) having a pin 256 engaging in the open slot of a lever 257 loosely mounted on shaft 260. The lever 257 is in connection with a detent 258 slidable on the special key bank, said detent being lifted on depressing one of the multiple-item keys 14, 15 and 16. Due to this connection, the lever 250 is rocked clockwise (Fig. 25) through a certain angle on depression of one of the multiple-item keys, while it is held in the position shown in Fig. 25 when no such key is operated.

Figure 23:
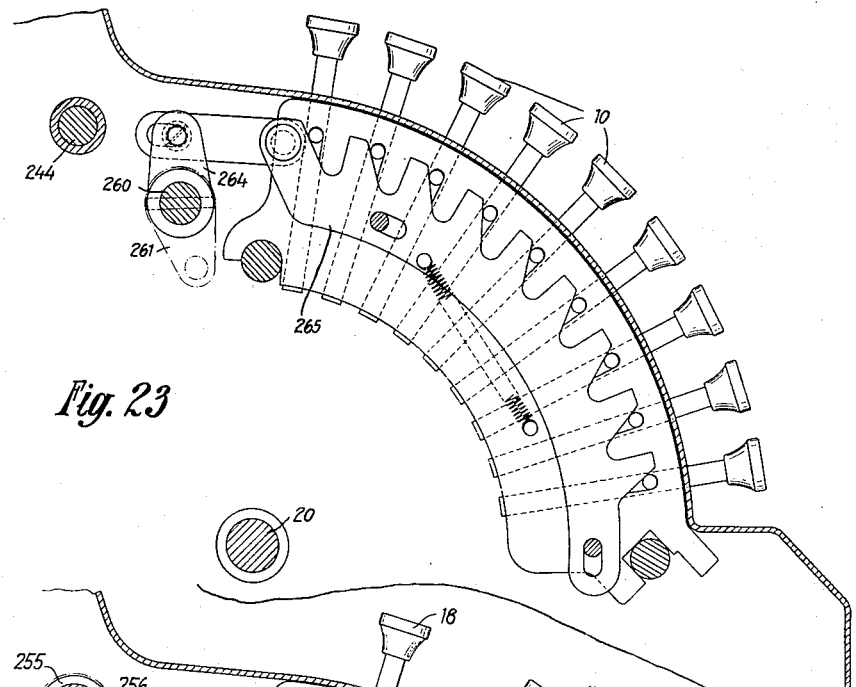

The two-armed lever 248 pivoted on pin 249 of lever 250, is connected to an arm 261 fast on shaft 260 by a notch formed in the free end of arm 248 engaging a stud in the free end of arm 261. The arm 261 is normally held by a spring 262 in contact with a stationary pin 263. Shaft 260 carries arms 264, one thereof lying in the plane of each amount key bank (Fig. 23) said arms cooperating with a detent 265 attached to the respective amount key bank, in such a manner that on depressing any amount key 10 the shaft 260 is rotated in counter-clockwise direction. Thus, on depressing an amount key, the two-armed lever 248 is rocked clockwise (Fig. 25) about pivot 249, whereas, normally, it is held in the position shown in Fig. 25.

The pitman 246 has an L-shaped slot 270 engaged by a pin 271 of an angular lever 272, 273. This lever is connected to a lever 274 carrying a roller 275 engaging in the cam groove of a disc 276 fast on the main drive shaft 108. Due to the race of the cam groove, lever 272, in each machine operation, is moved counter-clockwise through a certain angle and returned accordingly at the end of the machine operation. If an amount key or one of the multiple-item keys 14, 15, 16 has not been depressed, as is the case when a total is taken from the clerk totalizer, the commodity totalizer or the transaction totalizer or a change-giving or idle machine operation occurs, the pin 271 of the lever 272 is in the left-hand lower corner of the L-shaped slot 270 of the pitman 246 as can be seen from Fig. 25. If the lever 272 is moved, its pin 271 carries the pitman 246 upward. Consequently, also the shafts 244 and 150 respectively are moved.

If, for the purpose of recording a single amount, an amount key, but no multiple-item key has been depressed, the depression of said amount key causes the two-armed lever 248 to be turned clockwise about pivot 249, whereby the pitman 246 is moved to the left, so that its horizontal slot still embraces the pin 271. If the lever 272 is moved, its pin 271 carries the pitman 246 and thus rotates shaft 244 in clockwise direction and shaft 150 in counter-clockwise direction (Fig. 4).

If, besides an amount key, also a multiple-item key 14, 15, or 16 is depressed as is the case when items belonging to a multiple-item transaction are entered, then as explained above, the lever 250 with the stud 249 is rocked clockwise. As at this time the pin of the arm 261 is stationary and thus serves as pivot for the two-armed lever 248, the pitman 246 is moved to the left by a further step which causes the pin 271 of the lever 272 to enter the right hand lower corner of the L-shaped slot 270. Thus, when the lever 272 is actuated, its pin 271 moves idly in the left hand slot of the aperture 270, that is, the shafts 244 and 150 are not rotated.

If, however, only one of the multiple-item keys 14, 15, or 16 but no amount key is depressed, as is the case in taking the total of a multiple-item transaction, then, on depressing the multiple-item key the lever 250 is rocked clockwise and, by means of the stationary arm 261, the pitman 246 is moved to the left by one step out of its initial position. Thereby the horizontal portion of the aperture engages the pin 271, so that the latter, when lever 272 is actuated, lifts the pitman 246 and rocks the shafts 244 and 150 in clockwise and counter-clockwise direction (Fig. 4) respectively.

*Actuating and controlling the roller platens—audit strip printing*

The roller platen 501 located in the audit strip printing place, is rotatably carried by a tube 516 (Figs. 4, 4a and 17) carried by two arms 517 mounted on shaft 518. A stud 1517 (Fig. 17) projects from one end of the tube 516 and said stud is engaged by an actuating arm 544 on a shaft 545, said arm being connected by means of a strong buffer spring 546 with an angular lever 547 also mounted on shaft 545, in such a manner that a small relative movement between the angular lever 547 and lever 544 is possible. One other arm of the angular lever 547 has pivoted thereto one end of a lever 548 pivoted intermediate its ends to one end of a link 549 whose other end is pivoted to an arm 550 on shaft 150. The left hand end of the lever 548 carries two pins 551 and 561 (Figs. 4, 16, and 34B) arranged at different levels on either side of the rod. One arm of a bell crank lever 552, loosely mounted on shaft 200, is engaged by means of an open slot with the pin 551, the roller 553 of said lever being urged by spring 555 towards the periphery of a cam disc 554 fast on shaft 201. Pin 561 is engageable with the forked end of one arm of a bell crank lever 562 having a roller 563 which, under the action of a spring 565, bears on the periphery of a cam disc 564 also fast on shaft 201.

Figure 27:
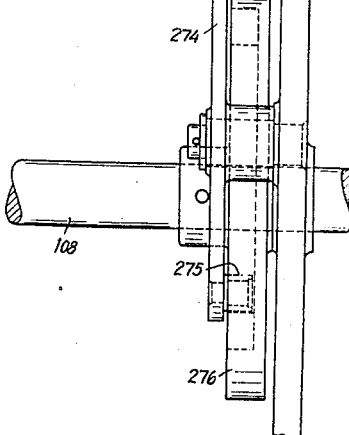

The cam discs 554 and 564 are shaped so that, when the shaft 201 rotates, the cam 556 of the disc 554 becomes operative just when the type set III is passing by the roller platen 501. If, at this time, pin 551 of the lever 548 is in the open end of the slot of the angular lever 552, the roller platen roll 501 is moved towards the rotating printing drum so closely that by means of the type carrier set III the amount of an item, the clerk's initial, and the kind of commodity belonging to a multiple-item transaction, is printed on the audit strip (Fig. 27) whereupon the roller platen 501 is removed from the printing drum.

When, for the purpose of entering a single amount, or taking a total, shaft 150 is rocked clockwise, the lever 548 is lowered so far, that pin 551 is moved out of the slot of the angular lever 552 and, instead, pin 561 is engaged by the angular lever 562. If, now, shaft 201 is rotated, cam disc 564 and its cam 566 cause through parts 562, 548, 547, 544 the roller platen 501 to be moved toward the printing drum just when the type set IV is passing by this printing point so that a print on the audit strip (Fig. 27) is effected, comprising all data except the date. The date is not printed at this time because the audit strip is not wide enough to receive the date printing.

*Printing the receipt slip*

Figure 12:
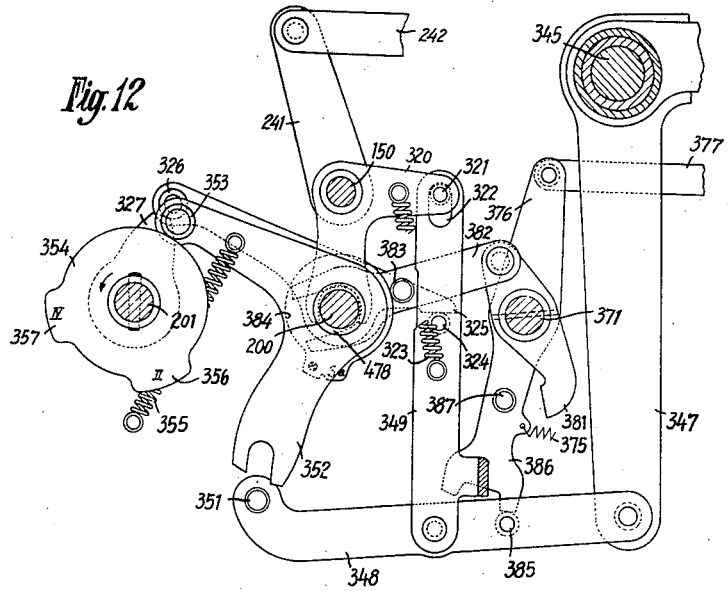

The roller platen 301 is pivoted on a tube 341 (Figs. 4, 4a, 12, 17) carried by two arms 344 on shaft 345. Normally due to the action of a spring 340, the arms 344 are held in contact with a stationary pin 339. By means of two strong buffer springs 346, the arms 344 are coupled with an angular lever 347, one arm of which has one end of a lever 348 pivoted thereto (Fig. 12). The lever 348 has pivoted thereon intermediate its ends a link 349 (Figs. 12 and 34A) having an elongated hole 322 engaged by a pin 321 of arm 320 mounted on shaft 150, the forked end of said arm riding on shaft 200 so as to be secured against rotation.

Between the link 349 and the arm 320 is a stretched spring 323 tending to pull the link 349 upwardly. Normally, however, this is prevented in that a pin 324 of the link 349 bears against the under side of a locking lever 325 pivoted on shaft 200 and having a roller 326 cooperating with a cam disc 327 on shaft 201.

The lever 348 has provided thereon a pin 385 which normally, is opposite the right hand locking surface of an arm 386 of a two-armed lever 376, 386 fast on shaft 371 (see also Fig. 16). Fast on shaft 371 is another lever 372 (Figs. 4 and 34B) having a roller 373 bearing under the action of a spring 375 on the periphery of a cam disc 374 on shaft 200, the said cam disc being actuated from the shaft 201 through the medium of the gearing 391, 392, 393. By means of a link 377 (Fig. 34A), arm 376 of the two-armed lever 376, 386 is connected to an arm 378 fast on shaft 379 carrying two feeler levers 380 (Figs. 17, 18).

When in initial position, due to the shape of the cam disc 374, the parts connected to the spring loaded shaft 371 are positioned as shown in Figs. 4 and 12, the feeler lever 380 freeing the opening for receiving the inserted slips. A pin 351 (see also Fig. 34A) of the lever 348 lies at this time outside of the fork of the appropriate bell crank lever 352 pivoted on shaft 200, the roller 353 of said bell crank lever engaging, under the action of a spring 355, the periphery of a cam disc 354 fast on shaft 201.

When the machine is operated with no slip inserted, the feeler lever 380 under the action of spring 375 is able to pass through an opening 1380 in the cabinet and then through the opening 1381 of the printing table 300, after the cam disc 374 has released the roller carrying lever 372. At this time, the shaft 371 is rotated to such an extent that the left hand locking surface of the locking lever 386 is located above the pin 385. If, now, the cam 327 releases the stop lever 325 and in consequence also the levers 348, 349 to operate under the action of spring 323, the said levers are prevented from moving upward due to locking lever 386. Thus the coupling pin 351 does not engage the bell crank lever 352. Consequently, the two rocking movements given the bell crank lever by two lobes 356 and 357 of the cam disc 354 are ineffective, that is, the roller platen 301 is not moved toward the printing drum. Near the end of the machine operation, the cam discs 374 and 327 restore the parts to initial positions (Figs. 4, 4A, 12, and 34A).

If, however, the machine is operated with a slip inserted, the feeler lever 380 under the action of spring 375 is arrested midway. Due to this, the shaft 371 with the locking lever 386 thereon, is rotated only to such an extent that the recess between the two locking surfaces of lever 386, confronts the pin 385. After releasing the stop lever 325, and, in connection therewith, the levers 348, 349, spring 323 is able to move the levers 348, 349 so far that pin 351 of the lever 348 is able to engage in the forked end of the bell crank lever 352. The two cams 356, 357 of the associated actuator disc 354 are arranged so that, through the parts 352, 348, 347, 344 on rotating the disc 354, the roller platen 301 is brought into cooperative relation with the printing drums just when the type sets II and IV are passing by this printing point. Thereby two identical prints on the receipt slip are effected showing all data necessary to identify the sale made (Fig. 33). The feed surfaces 310b and 310d provided at either side of the type sets, advance the inserted slip at this time so that those two prints are spaced as shown in Figs. 31 to 33. Thus, by means of this mechanism, the slip printing device is rendered operative and inoperative, respectively, depending on whether a slip is inserted or not. The manner in which the slip printing device is controlled in connection with special modes of registrations will be set forth hereinafter.

Check printing

Figure 14:
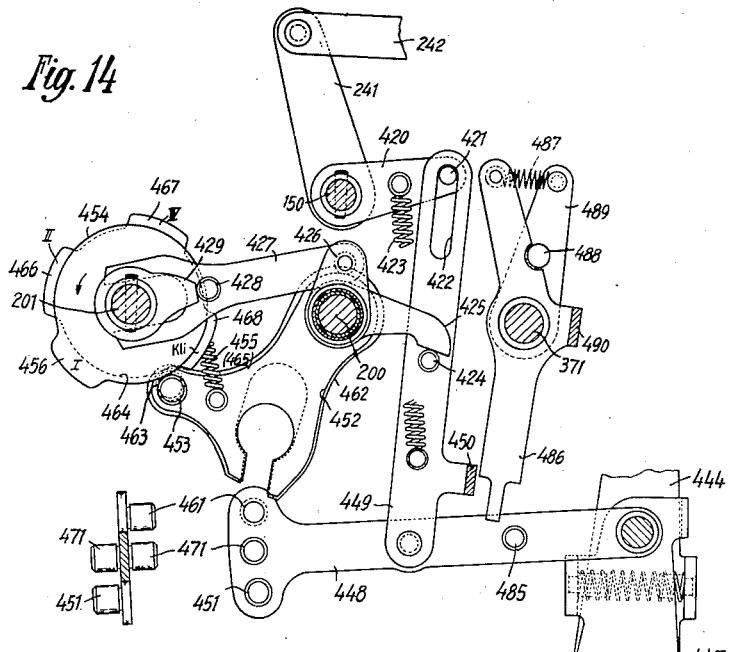

At the check printing point, the roller platen 401 (Figs. 4 and 4a) is supported by a tube 441 carried by two arms 444 pivoted on shaft 545. Normally, a spring 440 keeps the arms 444 in contact with a stationary pin 439. By means of two strong buffer springs 446 (Fig. 15) these arms are coupled with a lever 447 pivoted on shaft 545, the lever having pivoted thereto a lever 448. Pivoted on lever 448 is a link 449 (Figs. 14 and 34B) having an elongated slot 422 engaged by pin 421 of an arm 420 fast on shaft 150. Between the link 449 and the arm 420 is stretched a spring 423 tending to pull the link 449 upward. Normally, however, this is obstructed in that the pin 424 on link 449 bears against a stop lever 425 mounted on shaft 200, said lever being connected to a second arm 426 and cooperating with a cam 429 (see also Fig. 34A) fast on shaft 201 by means of the roller 428 of a pitman 427. With the parts so positioned none of the pins 451, 461, 471 fast on the lever 448 and arranged thereon as shown in Figs. 14 and 34B is in engagement with the appropriate actuator levers 452 and 462 loosely mounted on shaft 200, the rollers 453, 463 of said levers bearing, under the action of springs 455, 465, on the circumferential surface of cam disc 464 and 454 respectively, fast on shaft 201.

The pin 451, 461 or 471 which is to cooperate with the actuator levers 452 or 462 depends on the mode of machine operation and is controlled from the shaft 150 which is not operated in connection with the registration of amounts belonging to a multiple-item transaction, but rotated when single amounts are entered, or totals taken. Further, which pin 451, 461, or 471 is to cooperate with the lever 452 or 462 depends on whether or not amount keys are depressed and, in addition thereto, whether or not a record material is put into the slip printing place.

To control printing on a check from the slip, the lever 448 carries a pin 485 lying in the plane of a locking lever 486. Under the action of a spring 487, this lever engages a stud 488 of arm 489 fast on shaft 371. Due to this connection, the shaft 371 which, as mentioned above, in machine operations where slips are inserted, is rotated counter-clockwise through a certain angle and through twice this angle when no slip is being inserted. The shaft 371 moves the spring coupled locking lever 486 into a position above the pin 485 if a slip is present in the slip chute, but when a slip is not present in the slip chute, the shaft 371 does not rock far enough to move the lever 486 into the path of the pin 485. If the locking lever 486 is placed above the pin 485, the lever 448 is prevented from being moved by the action of spring 423 after the stop lever 425 has released the link 449. Thus, at this time, none of the pins 451, 461, and 471 engages with the actuating levers 452, 462, that is to say, the operation of said levers does not affect the roller platen 401 and, normally, check printing is rendered inactive when a slip is inserted.

If the locking lever 486 is moved out of the path of pin 485, spring 423 is able to move the link 449 upward until it is held stopped at different positions by one or more adjustable stop members 421 and 431 or 473 respectively.

The stop lever 431 is loosely mounted on shaft 371 (Figs. 15 and 34B) and, by means of a bail 432, arm 335 (Figs 13 and 34A) and a link 434 (Fig. 18), connected with an arm 435 fast on shaft 260 in such a manner that it is rocked in counter-clockwise direction when the shaft 260 is rotated on depressing an amount key. By this, said lever 431 is moved out of the path of an extension 450 of the link 449 while otherwise, that is to say, if no amount key is depressed, the lower locking surface of said lever is opposite said extension and a certain distance therefrom.

Check printing in total taking

When the stop lever 431 lies in the path of the extension 450, for instance, in total taking, and when the locking lever 425 releases the link 449, the spring 423 urges the latter upward until the extension 450 encounters the stop lever 431. Thereby the pin 461 of lever 448 comes into engagement with the associated actuator lever 462. The appropriate cam disc 464 has three cams 466, 467 and 468 which, on rotating the shaft 201, cause the anti-friction roll to be urged towards the rotating printing drum when the sets II and IV of the type wheels and the electro 148 are passing by the check printing point. By this the check (Fig. 30) receives two similar prints comprising all data relating to the registration effected, and a print from the electro. Due to the print from the electro, effected at the last instance, the check strip is fed so that the last amount printed from set IV of the type wheels is brought to lie above the cutting mechanism 216, 217 while the print from the electro, lying in between the knife and the printing point, remains within the machine in readiness for the next check.

Multiple-item check

On depressing an amount key the stop lever 431 is rocked out and link 449, after being released from the locking lever 425, is free to be moved upward by means of the spring 423 so far that the lower end of the slot 422 contacts with pin 421. As before mentioned this pin 421 is in the upper position shown when amounts belonging to a multiple-item transaction are entered. Slot 422 is of a length such that the link 449 is moved upward by three steps, by which the coupling pin 451 comes into engagement with the actuator lever 452, while the other pins 461 and 471 rest in recesses on the actuator levers 452 and 462 and, due to this, are not affected when the actuator levers are moved by the cam discs 454, 464. At this time, the roller platen 401 is under control of the cam disc 454 having a cam 456 which, when the shaft 201 is driven, moves the roller platen 401 so that the latter is permitted to cooperate only with type of set I of the rotary printing drum. At this time, the amount of the transaction and a word denoting the article sold is printed on the check from small type (Fig. 29) to call the customer's attention to the fact that the amount printed, belongs to a multiple-item transaction. After all the items of a multiple-item transaction have been registered in this manner, during a special total taking operation the total of these items is taken and simultaneously, as mentioned above, prints are taken from the sets II and IV of the type carriers and the electro, as at this time, the stop lever 431 limits the upward movement of the bar 449 after the first step so that the coupling pin 461 is rendered operative.

Thus, the multiple-item check 4021 (Fig. 29) has printed upon it the data standing on the electro, the individual items of the multiple-item transaction and the multiple-item total printed twice, the prints of the items and the multiple-item-total being distinguished from each other by the different sizes of the type and the differing data.

If, during one or more operations of the machine necessary to print and issue an itemized check, a slip is inserted by error, the item would not be printed on the check. However, the item would be printed on the slip which easily could be used for fraudulent purposes. To prevent this, a lever 381 (Figs. 12 and 34A) is provided which is mounted on shaft 371 and which by means of the spring actuated pitman 382 pivoted to the said lever and the roller 383 of the pitman, cooperates with a control disc 384 fast on sleeve 478. The sleeve 478 is adjusted by the special key bank differential through sleeve 47, segment 48 (Fig. 8), and a segment 479 meshing therewith. The lower end of lever 381 is opposite a pin 387 on locking lever 386, but is a sufficient distance therefrom that the pin 387 strikes the lever 381 only when the locking lever 386 has been rocked to the right to its greatest extent, so that, thus, the lever 381 normally does not prevent the movement of the locking lever 386.

If, during one of the machine operations for printing and issuing an itemized check, a slip is inserted, then the locking levers 386 and 486 under control of the slip feeler are rocked, so that slip printing would be enabled and check printing would be disabled. However, the control disc 384 is so adjusted, if key 14 is depressed, that its cam portion marked "Sa" faces the roller 383 of pitman 382 whereby the lever 381 is rocked in clockwise direction. At this time, the lever 381 strikes the pin 387 of the locking lever 386 and keeps the latter and the locking lever 486 in initial position so that the locking lever 386 disables slip printing whereas locking lever 486 permits check printing.

Single-item check

Figure 15:
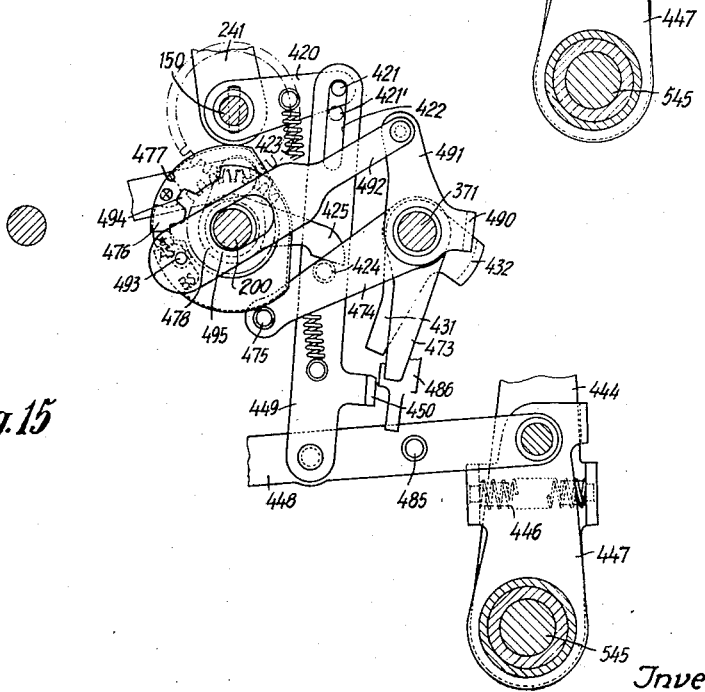

When transactions consisting only of one single item are to be entered, the arm 420 fast on shaft 150, is moved downward (Figs. 14, 15, and 34B). In this case, the spring 423 under the above-mentioned conditions, that is when the locking levers 431, 486 and 425 are held disengaged, is able to move the lever 448 and link 449 upward by two units until the lower end of slot 422 contacts pin 421 in its position 421'. Thereby the pins 471 are brought into engagement with the two actuating levers 452, 462, so that at this time the roller platen 401 is under the control of the two cam discs 454, 464. The cams 456, 466, 467, 468 of said discs cause the roller platen 401 to be urged towards the rotating printing drum when the sets of type carriers I, II and IV and the electro 148 are passing by the check printing point.

When shaft 201 is driven, first of all, cam 456 becomes effective coupling the roller platen 401 to cooperate with type set I, at which time the amount of the single-item transaction is printed on the check strip from the small type of this set of type carriers and the name of the article sold from the word printing drum 908. Thereupon the two cams 466, 467 cause the roller platen 401 to cooperate with the two similar type sets II and IV which now effect a duplicate print of the single-item transaction and all data necessary, just as is done in connection with total printing. The knurled portions 310b level with type set II are so shaped that, due to their action the check is fed, before and after the print is taken from this set, in such a way that the print effected is suitably spaced from the foregoing and the following print. Finally, during printing from the electro caused by cam 468, the check strip is fed up to the cutting device, whereupon the completely printed single-item transaction check (Fig. 28) is cut off.

Slip and check printing

By means of the above described slip feeling device 371—380 (Figs. 4A, 12, 14. and 34B) and the locking levers 386 and 486, the printing device is so controlled that, normally, when a slip is inserted, check printing is disabled, but permitted when a slip is not inserted.

As, inconnection with certain machine operations, for instance, in registering charge sales and payments on account, it is desired to hand the customer a bill or receipt and to keep a voucher in the files, provision is made that in such a machine operation, which are similar to an operation for entering a single-item cash transaction, a check and a receipt are printed simultaneously.

To this end, the locking lever 486 is, in the manner described above, coupled by a spring with the shaft 371 and, also is connected by means of a bail 490 (Figs. 14 and 15) and an arm 491 with a pitman 492, having a roller 493 lying in the plane of a cam disc 494. This cam disc is loosely mounted on shaft 200 and rigidly connected to a bevel gear 220 which gears with a planetary gear 221 (Figs. 15, 16, 16a, and 34B). This planetary gear is pivoted on stud 222 fast on the right hand end of a tube 495, the other end of which has secured thereto a rack segment 496 gearing with the setting segment 48 for adjusting the type wheels associated with the transaction key bank. On the other side, the planetary bevel wheel 221 gears with a bevel wheel 223 rigidly connected to a gear 224 which, in turn, gears with a wheel 228 through gears 225, 226, 227. This gear 228 is fast on the right hand end of the tube 478 connected, over a rack segment 479 to the setting segment 48 of the special key bank. Due to this connection, the cam disc 494 can be adjusted in accordance with the keys operated under control of either the keys 14, 15, and 16 of the special key bank or the keys 13 of the transaction key bank, or in addition thereto, under the joint control of the keys of these two banks.

The cam disc 494 is shaped so that normally, that is, when neither key "R" or "C" has been depressed, the roller 493 rests on the lower circumferential surface of the cam disc. The two-armed lever 486, 491 is thus permitted to follow the movement controlled by the slip feeler, of the lever 489, at which time the roller 493 depending on whether a slip is inserted or not, is removed from the periphery of the cam disc 494 by one or two steps.

However, when the machine is conditioned for recording a "charge" sale (c), or an amount received on account (R), the cam disc 494 is turned so that its cam 497 moves the roller 493 to the left by two steps whereby the feeble spring 487 is tensioned and the two-armed lever 491, 486 is rocked counter-clockwise by two steps. During this machine operation, the locking lever 486 assumes its extreme right-hand position, in which it releases the pin 485 of the check printing device.

When, in connection with such a registration, a slip is inserted the locking lever 386 which is controlled directly by the slip feeler is adjusted so that it releases the slip printing device.

Due to this, in this machine operation, in addition to the audit strip, a slip and a check as well, are printed by the type set IV, the receipt slip by type sets II and IV and the check by type sets I, II and IV and the electro 148.

*Multiple-item slips*

When receipt slips are used, two kinds of multiple-item transaction entry and total taking thereof are employed in recording a multiple-item transaction of a customer.

In one instance, a series of articles is sold to the customer by one and the same sales person who writes on the slip 3021 (see Fig. 31) the articles sold. Now, the customer takes that slip to the cashier's booth, where the individual items are read from the slip and set up on the keyboard and, upon operating the 'BS' multiple-item key 16 in combination with the amount keys 10, the items are entered into the machine without, however, inserting the slip into the machine. Due to the fact that the slip is not inserted, the shaft 371 is rocked to its full extent in all these machine operations, so that the locking lever 386 disables the slip printing device. When this occurs, the lever 486 would release the check printing device which, however, must be prevented in this instance.

For this purpose, the shaft 371 carries a twin lever 473—474 (Figs. 15 and 34B) having a roller 475, extending from each side of the lever 474, engaging, under the action of a spring, the cam discs 476 and 477. The cam disc 476 is fast on the tube 495 which, as mentioned already, is connected to the setting segment 48 of the transaction key bank 13, whereas the cam disc 477, through a tube 478 and a rack segment 479, is connected to the setting segment 48 associated with the special key bank 14, 15, and 16. The disc 476 has a notch marked with an asterisk which faces the right-hand pin 475 (Fig. 34B) in cash transactions. Normally, however, pin 475 is unable to drop into this notch, as it is prevented from doing so by the unmutilated circumferential surface of cam disc 477. In this position, the locking lever 473 lies outside the path of the extension 450 of the bar 449, so that said lever does not hamper this bar from moving upward. If, however, upon depressing the multiple-item key 16, the disc 477 is rotated correspondingly, the notch (BS) in the said disc also faces the pin 475. Now, the pin is allowed to drop into both the notches of discs 476, 477 which positions the locking lever 473 so as to be above the extension 450 and prevents the bar 448 from engaging one of the actuator levers 452, 462. Under these circumstances, both the slip and the check printing devices are disengaged in recording multiple-item transactions, which are read from a slip like that illustrated in Fig. 31. As the machine is conditioned for entering multiple-item transactions, the items belonging to such transactions are printed on the audit strip by the type set III as described above (see Fig. 27, transaction No. 1237).

If, by error, during these item entry machine operations, a slip is inserted into the machine, a print must not be made thereon. To this end, shaft 371 has mounted thereon another locking pawl 309 (Figs. 13, 16, and 34A), which is connected to an arm 311 having a pin 312 bearing, under the action of a spring, against a cam disc 313 fast on tube 478 and, normally is held outside the path of an extension 350 of the link 349.

When the cam disc 313, due to the depression of the multiple-item key 16, is positioned properly, a notch (BS) is moved so as to come in front of the pin 312 which is now free to drop in, whereby the locking pawl 309 is caused to overlie the extension 350, thus locking the slip printing device, in spite of the fact that the locking lever 386 under control of the slip feeler has released the pin 385.

The locking pawl 309 has a slot engaged by the pin 314 of a link 315 which by means of an arm 316 is connected to the shaft 150 which is not rotated in entering amounts of a multiple-item transaction, but is turned through a certain angle during all other machine operations. In this case, as before, the slot in the pawl 309 permits the pawl to drop into the notch (BS) of the cam disc.

After all the individual amounts of a multiple-item transaction have been entered, while the check and slip printing devices are held locked, the (BS) key 16 is depressed but no amount key is depressed and thereby the multiple-item total is taken which is to be printed on the slip. Due to the inserted slip the locking lever 386 (Fig. 12) releases the coupling bar 348 of the slip printing device while the locking lever 486 (Fig. 14) locks the coupling bar 448 of the check printing device. As, at this time, that is, during a total taking operation, the shaft 150 is rocked, the link 315 retracts the pawl 309 from locking position, so that the slip printing device is released completely.

In multiple-item total taking operations, the slip is inserted and the multiple-item total is printed twice upon it by means of the type carrier sets II and IV while the same print on the audit strip is effected by set IV, and check printing disabled.

*Multiple-item total taking from a series of slips*

When a plurality of slips are used for each transaction, that is, when a customer makes several purchases in different departments and each of the sales persons, handling such sales, hands him a separate slip 302 with a sales record written thereon (see Fig. 32), then multiple-item entries and total taking thereof must be performed in a different manner from that described already. In such instances, the customer will hand over to the cashier the plurality of such sales slips to have them totalized and receipted and then pay the total amount. To register such a transaction the cashier operates the key 15 "AS" causing the multiple-item totalizer to be thrown into engagement. Thereupon the amount on each slip is set up on the keyboard in combination with the "AS" key and thereby the amount is entered in a separate machine operation, the slips being inserted into the machine and receipted by means of a complete duplicate print effected by the sets II and IV of the type carriers (see Fig. 32) while check printing is prevented and the individual amounts of the multiple-item transaction are printed on the audit strip by means of set III of the type carriers, as illustrated by transaction No. 1238, Fig. 27.

Figure 13:
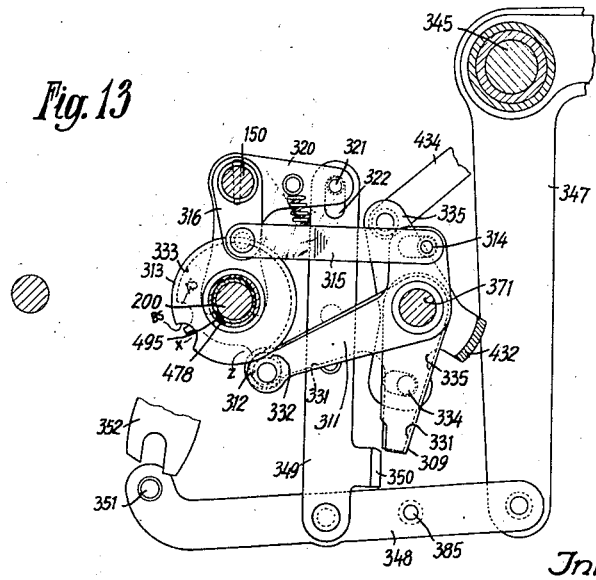

If, at this time, a slip is not inserted, either intentionally or unintentially, the slip printing device is, of course, rendered ineffective by the locking lever 386 (Fig. 13). However, a check is not printed, since the pawl 473 (Fig. 15) can drop into its locking position, due to the notches of both the control disc 476, adjusted to "cash" transactions, and the control disc 477 positioned according to the operated key "AS" being opposite the pin 475.

After all the slips are receipted in this way, the multiple-item total is taken under control of the "AS" key 15, but without inserting a slip. Due to this, the locking lever 486 (Fig. 14) releases the check printing device, which, however, as set forth above, is locked in that the pawl 473 is in locking position due to a notch in each of the two control discs 476 and 477 facing the pin 475.

Figure 41:
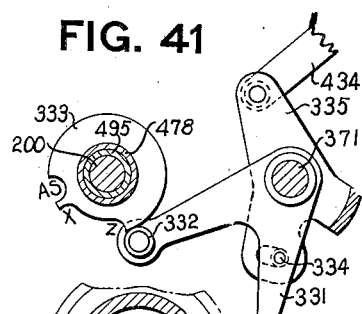
Figure 41 is a detail view of some of the parts shown in Fig. 13.

In multiple-item total-taking operations, where the items standing on separate sales slips (Fig. 32) belonging to a multiple-item transaction are totalized, means must be employed to ensure that no further slip becomes imprinted with the multiple-item total since no other is needed for this transaction, and because such additional slip could be easily misused under suitable conditions. To prevent this, the shaft 371 carries a locking pawl 331 (Figs. 13, 34A and 41) having a roller 332 which under the action of a spring engages the control disc 333 fast on tube 478. A pin 334 of the locking pawl engages the slot in a lever 335 which, due to its being connected to shaft 269 by means of parts 434—435 (Fig. 18), is rocked counter-clockwise as viewed in Fig. 13, upon depressing an amount key. When the control disc 333 is positioned in accordance with the multiple-item key "AS," a notch of said disc faces the pin 332. In registering the items comprising a multiple-item transaction, the pin 332, however, cannot enter the notch, as the lever 335, on depressing an amount key, has been rocked, so that its slot does not allow the pin 334 to move to the left. Thus, the locking surface remains thrown out and the inserted slip is printed.

In taking the multiple-item total, the roller 332 is allowed to enter its notch in the disc 333 since the pin 334, due to the fact that an amount key has not been depressed, is permitted to move to the left in the slot of lever 335. Thus, the locking pawl 331 engages the extension 350 and thereby locks the slip printing device. Thus, when entering a multiple-item transaction from a plurality of slips, such as is illustrated in Fig. 32, the total amount of the transaction is not printed on a slip.

*Automatically disabling check printing*

Very often it is desirable to abstain from issuing checks in connection with cash sales, and to issue checks only when some special transactions are registered, for instance, amounts paid out, charge sales or amounts received on account. On depressing the special key 18 (Figs. 1 and 24), the machine is conditioned for this kind of automatic check control and held so conditioned, until key 18 is released again by operating the release key.

Figure 39:
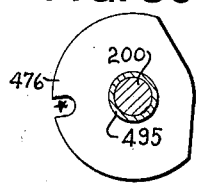
Figure 39 is a detail view of a control disc shown in Fig. 15.
Figure 40:
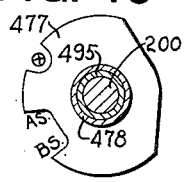
Figure 40 is a detail view of a control disc shown in Fig. 15.

When the control disc 477 (Figs. 15, 34B, and 40) set under control of the special key bank, is positioned under control of key 18, a notch of said disc is opposite the pin 475 of the double lever 473, 474. As the pin 475 cooperates also with the control disc 476 (Figs. 15 and 39) under control of the transaction keys 13, locking of the check printing point can be placed under control of any transaction key 13. In the present instance, check printing is disabled in connection with cash sales. For this purpose, the control disc 476 has a notch at the spot that corresponds with the key "cash," said notch permitting the pin 475 to drop in whereby the pawl 473 locks the check printing mechanism.

When transactions of other character (for instance, recording amounts paid out, charges, amounts paid on account) are handled, the unmutilated surface of the control disc 476 is moved opposite the roller 475, so that this roller cannot enter the notch, assigned to key "check off," of the control disc 477, notwithstanding the fact that said notch confronts the roller. At this time the check printing mechanism is not disabled. When key 14 (Sa) is depressed for entering a multiple-item transaction and issuing a check, the key 18 is released. During the operation of the machine, an unnotched edge of the disk 477 is moved into the path of roller 475 and, therefore, a check will issue even though the disc 476 is set with a notch in the path of 475, under control of the cash key 13. Thus, when the key 14 is depressed, a check is issued, except when a slip is inserted into the machine, in which case the check is thrown off by the slip feeler mechanism.

If, with the key 18 depressed, a slip has been inserted in error, no print must be made thereon. To this end, the control disc 384 (Fig. 12) positioned, as described, under control of the special key bank, is provided with another cam which rocks the lever 381 clockwise by two steps when the control disc 384 is positioned according to the depressed key 18. Thereby, the feeler mechanism is moved into ineffective position whereby the locking lever 386 locks the slip printing mechanism.

*Printing operations in connection with reading and total taking*

For the purpose of reading or total taking respectively of the insertable keys, the extension 162 (Figs. 1 and 24) of the tumbler of lock 17 is moved into the corresponding position marked "X" or "Z" and the desired totalizer key 11, 12 or 13 depressed. The control disc (Figs. 13 and 34A) controlled by the special key bank, is at this time positioned so that a notch thereof is opposite the roller 332 of lever 331, so that the locking lever 331 is permitted to enter and to overlie the extension 350 of the link 349. Thereby the slip printing device is locked regardless of whether or not a slip is inserted. At this time, the check printing device is not held locked since the stop lever 431 (Figs. 15 and 34B) due to the fact that no amount key is depressed, lies in the path of extension 450 (Figs. 14 and 15) and permits the link 449 to move upward one step, the pin 461 of the lever 448 coming into engagement with the actuator lever 462. The lever 462, when actuated by the cams of the actuator disc 464, causes the roller platen 401, during the rotation of the printing drum, to cooperate with the type sets II and IV and the block 148 which results in the issuance of a total check illustrated by Fig. 30. When issued from registers operated, for instance, by waiters in restaurants, this total check serves as a voucher to check the daily takings of each waiter, said check being distinguished conspicuously from transaction checks in that such checks do not have printed thereon the single-item transaction indicating the nature of the article sold.

Due to this, the locking lever 486 is, by means of the slip feeler 380, so adjusted that it is positioned above the pin 485 (Fig. 14) and, thus, the check impression rollers are prevented from actuation by their actuating cams 454, 464. The disk 333 which, at this time, is adjusted to "reading" (X) or "resetting" (Z) respectively, (Fig. 13), causes clockwise movement of the lever 331 and engagement of it with the extension 350 of bar 349 to block the slip impression roller. Thus, neither a check nor a receipt will be printed, whereas all data of the transaction is printed on the audit strip, as the shaft 150 is moved and pin 561 (Fig. 4) is coupled thereby with the actuator lever 562, the cam disk 564 thereof causing the anti-friction roll 501 to cooperate with the type set IV.

While the forms of mechanism herein shown and described are admirably adapted to fulfill the objects primarily stated, it is to be understood that it is not intended to confine the invention to the forms of embodiment herein disclosed, for it is susceptible of embodiment in various forms all coming within the scope of the claims which follow.

What is claimed as new is:

1. In a printing device for cash registers, accounting and the like machines, a rotary shaft, a support for said shaft, discs of different diameters alternately fixed to said shaft to form recesses and arranged in two separate groups on said support, ring gears having internal and external teeth rotatably mounted in said recesses, connecting means arranged within the discs in sets of a number less than the number of corresponding ring gears of the groups to be operably connected, several sets of type wheels arranged circumferentially around the ring gears and in operative engagement with one of said ring gear groups to be differentially adjusted by said one ring group and rotated with the said one ring group, and means to differentially actuate the ring groups.

2. In a printing device for cash registers, accounting and the like machines, a rotary shaft, a support secured to said shaft and rotated with said shaft, discs of different diameters alternately mounted on said shaft to form recesses and arranged in two separate groups, a group of ring gears rotatably mounted in each group of recesses, a floating connecting means for said ring gears to connect the ring gears of each group together and arranged within the discs in sets of a number less than the number of ring gears of both groups, a drum rotatably mounted on said support; several sets of type wheels supported by said drum and arranged circumferentially in equal distances on said drum and in operative engagement with one of said groups of ring gears and set by the ring gears, means to lock the type wheels in the position to which they are set by the ring gears, means to maintain the set of ring gears not engaged by the type wheels against rotation, and means to thereafter rotate the drum on said support and thereby rotate the group of ring gears that is in engagement with the type wheels in the said recesses and through the floating connecting means rotate the shaft through a compensating distance.

3. In a printing device for cash registers, accounting and the like machines, a rotary shaft, a support secured to said shaft and rotatable with said shaft, discs of different diameters alternately fixed to said shaft to form recesses and arranged in two separate groups, a set of ring gears rotatably mounted in each group of recesses, shafts having gears on each end, tubes having gears on each end, each tube supported by one of said shafts, said shafts and tubes passing through bores in the discs and having a gear on one end of each shaft and tube meshing with one ring gear of one group of ring gears, a planet gear meshing with each ring gear of the other group of ring gears and with the other gear on each shaft and tube, thereby connecting corresponding ring gears of both groups, a plurality of sets of type wheels of different character for setting up different data in some of said sets, said sets supported by said rotary support and arranged circumferentially in equal distances and in operative engagement with one of said groups of ring gears and set thereby, means to lock the type wheels in the position in which they are set by the ring gears, means to maintain the set of ring gears not engaged by the type wheels against rotation, and means to thereafter rotate the drum on said support and thereby rotate the group of ring gears, that is in engagement with the type wheels, in said recesses and through the shafts, tubes, and gears thereon and the planetary gear, rotate the shaft through a compensating distance.

4. In a printing device for cash registers, accounting and the like machines, a rotary shaft, a support secured to said shaft and rotatable with said shaft, discs of different diameters alternately fixed to said shaft to form recesses and arranged in two separate groups, ring gears having outer and inner teeth rotatably mounted in said recesses, shafts, tubes supported by said shafts, a gear on each end of each shaft, a gear on each end of each tube, a gear interposed in recesses of the respective discs between said shaft gears and tube gears respectively and the inner teeth of respective ring gears of one of said groups of ring gears for connecting corresponding groups of ring gears together, said shafts and tube sets passing through enlarged bores of the discs to receive their gears, several sets of type wheels of various characters in single sets for setting up different data differing at least in some of the sets, a shaft for each type wheel set, said type wheel sets arranged circumferentially in equal distances around said group of ring gears and in operative engagement with said one group of ring gears to be rotated thereby, walls secured to each end of the said type wheel supporting shafts to form a unique drum, teeth provided on said drum, and actuating means connected with the teeth for rotating said drum for printing operations.

5. In a printing device for cash registers, accounting and the like machines, a drum like body rotatably mounted in the side walls of the machine, ring gears having outer and inner teeth rotatably arranged in two groups one group extending inside the drum like body and the other group extending outside the drum like body, planetary gear connections arranged between corresponding ring gears of said groups, type wheel supporting shafts secured circumferentially to said body in equal distances several type wheel sets mounted on said type wheel supporting shafts for setting up various data, means to rotate the drum for printing operations, a plurality of printing platens to coact with the type wheels as the drum is rotated, and means to select the platens for coaction with the type wheels.

6. In a printing device for cash registers, accounting and the like machines provided with manual setting means, a drum like body rotatably mounted in the side walls of the machine, ring gears having outer and inner teeth rotatably arranged in groups, one group located within said drum like body, and the other group operably connected to said setting means, planetary gear connections arranged between corresponding rings of the groups passing through bores of the drum like body the bores being enlarged at the proper places to receive the connecting gears, type wheel supporting shafts secured circumferentially to said body in equal distances, type wheel sets arranged on said wheel shafts and connected to the group of ring gears located within the drum like body for setting up various data, and a word printing drum mounted on an eccentric portion of one of said shafts.

7. In a printing device for cash registers, accounting and the like machines provided with manually operable setting means, a drumlike body rotatably mounted in the side walls of the machine, ring gears having outer and inner teeth rotatably arranged in groups one of said groups disposed inside of said drumlike body, and one of said groups operably connected to said setting means, planetary gear connections arranged between corresponding ring gears of the groups said connections passing through bores of the drumlike body and the bores being enlarged at the proper places to receive the connecting gears, type wheel supporting shafts secured circumferentially to said body in equal distances, a word printing drum mounted on an eccentric portion of one of said shafts, type wheel sets including date printing wheels arranged on said wheel shafts for setting up various data differing at least in some of the sets, a symbol printing wheel on some of the wheel shafts operably connected with the word printing drum, and a consecutive number printing device arranged on said drumlike body.

8. A printing device for cash registers, accounting and the like machines having manually operable setting means and a differential mechanism cooperating therewith, comprising a rotary drum body having mounted thereon two groups of ring gears having inner and outer teeth one group of which serves for operative connection with the differential mechanism, planetary gear connections arranged inside said drum body for interconnecting corresponding ring gears of the said groups, type wheel sets of various characters for setting up differing data in accordance with the setting means operated, a rotatably mounted support for the type wheel sets to locate the sets circumferentially to said drum body in equal distances, said type wheel sets being permanently in mesh with the ring gears of the other group, date printing wheels in some of the type wheel sets, a consecutive number printing device controlled by said setting means and a word printing wheel in one of said type wheel sets.

9. A printing device for cash registers, accounting and the like machines having manually operable setting means and a differential mechanism cooperating therewith, comprising a rotary drum having mounted thereon two groups ring gears having inner and outer teeth one group of which is connected with the differential mechanism, planetary gear connections arranged inside said drum for interconnecting corresponding ring gears of said groups, type wheel sets of various characters permanently meshing with the other of said sets of ring gears for setting up differing data in accordance with the setting means operated, a rotatable supporting means for said type wheel sets, whereby the type wheel sets are arranged circumferentially to said ring gears in equal distances, independently settable date printing wheels in some of the type wheel sets, a consecutive number printing device controlled by said setting means, a word printing drum at least in one of said type wheel sets, and gear connections for correspondingly differentiating type wheels in some of the sets and said word printing drum.

10. In a machine of the class specified, amount setting means, a differential mechanism cooperating with said setting means, manipulative means, a rotary printing means provided around its circumference with several type wheel sets, a rotating drum, planetary gear connections disposed within the drum and comprising a group of ring gears having outer and inner teeth in operative engagement with said differential mechanism and an other group of ring gears in permanent mesh with the type wheel sets, a drive to rotate said drum to take impressions, impression means common to some of the type wheel sets, and means operated under control of the manipulative means to control the impression means, whereby the impression means coacts with one or more of the type wheel sets while the drum is rotated by the drive to take impressions.

11. In a printing mechanism for a machine of the class specified, a printing drum having secured thereto circumferentially a plurality of type wheel sets of differing character according to number and kind of data to be set thereon and provided with several printing points including a check and a slip printing point, multiple item keys, a slip feeler at the slip printing point, impression rollers provided on each printing point and adapted to cooperate with said type wheel sets, means for actuating said rollers, and means for controlling said actuating means adapted to function differently in cooperation with the slip feeler for slip and for check printing according to the multiple item key which is operated.

12. In a machine of the class specified, amount key banks, a differential mechanism cooperating with each key bank, control keys, a rotary printing means provided around its circumference with several type wheel sets, a drum mounted within the rotary printing means, planetary gear connections arranged in the interior of the drum for permanently connecting said type wheel sets with the differential mechanism and adapted to rotate relatively to the rotary printing means when the printing means is rotated, a drive means for rotating said printing means during the later part of the machine operation, and several impression means common to the type wheel sets but normally out of cooperating relation therewith, and means actuated under the control of the control keys for moving the impression means into contact with the type wheel sets as the type wheel sets pass the impression means during rotation of the drum.

13. In a machine of the class specified, amount key banks, special key banks, a differential mechanism cooperating with each kind of key banks, control keys, a rotary printing means provided around its circumference with several type wheel sets, a rotating drum mounted inside the rotary printing means, planetary gear connections arranged in the interior of the drum for permanently connecting said type wheel sets with the differential mechanism, a drive means for rotating said printing means during the later part of the machine operation, several rockable impression rollers each positioned at a certain printing point, and means actuated under control of the control keys to move the impression means into engagement with a type wheel set as the type wheel set passes the printing means during rotation of the printing means.

14. In a machine of the class specified, amount key banks, special key banks, a differential mechanism cooperating with each kind of key banks, control keys, a rotary printing means having rotatably secured thereto around its circumference several type wheel sets, a drum mounted within the rotary printing means, planetary gear connections arranged in the interior of the drum for permanently connecting said type wheel sets with the differential mechanism and adapted to adjust the type wheels of the various sets while the drum is stationary, locking means adapted to lock the drum during the time the type wheels are adjusted, means to thereafter hold the type wheels in adjusted position, a drive means for rotating said printing means with the type wheel sets held in adjusted positions during the later part of the machine operation, several impression means common to the type wheel sets, and means adjustable under control of the control keys to move the impression means into cooperative relation with the type wheel sets as the type wheel sets move past the impression means.

15. In a machine of the class specified, amount key banks, special key banks, a differential mechanism cooperating with each kind of key banks, control keys, a rotary printing means provided around its circumference with several type wheel sets, a drum mounted within the printing means and rotatable relatively to the printing means, planetary gear connections arranged in the interior of the drum for permanently connecting said type wheel sets with the differential mechanism, a drive means for rotating said drum during the later part of the machine operation supporting means for record material at certain printing points at the outer rim of the printing means, several rockable impression rollers each positioned at one of the printing points, and means operable under control of the control keys to move the impression rollers, whereby the rollers are engaged with a type wheel set passing the impression rollers during rotation of the impression means, and with the respective record material for imprinting.

16. In a machine of the class specified, amount key banks, special key banks, a differential mechanism cooperating with each kind of key banks, control keys, a rotary printing device provided around its circumference with several type wheel sets, a rotary drum mounted within the rotary printing device and movable relatively to each other, planetary gear connections arranged in the interior of the drum for permanently connecting said type wheel sets with the differential mechanisms, a drive means for rotating said printing device during the later part of the machine operation, an inking ribbon resiliently arranged around the printing device, means to support record material at certain printing points adjacent the outer rim of the printing device, several rockable impression rollers each positioned at one of the printing points, and means controlled by the control keys to move the impression rollers into engagement with a type wheel set passing during rotation of the printing device, with the record material and the inking ribbon for imprinting and feeding them respectively.

17. In a machine of the class specified, amount key banks, special key banks, a differential mechanism cooperating with each kind of key banks, control keys, a rotary printing device provided around its circumference with several type wheel sets, a drum rotatable inside of the printing device and relatively thereto, planetary gear connections arranged in the interior of the drum for permanently connecting said type wheel sets with the differential mechanism, a drive means for rotating said printing device during the later part of the machine operation, supporting means for record material placed at certain printing points at the outer rim of the printing device, several rockable impression rollers each positioned at one of the printing points, and means settable under control of the control keys to select and engage the rockable impression rollers with a type wheel set passing during rotation of the printing device, and with the respective record material for feeding it.

18. In a machine of the class specified, amount key banks, special key banks, a differential mechanism cooperating with each kind of key banks, control keys comprising a multiple item key, and a multiple item total key, a rotary printing means having rotatably secured thereto around its circumference several type wheel sets, one of which contains numeral type wheels and a word type drum only, connecting means between the differentials and the type wheel sets to differentially adjust the type wheel sets by the differential mechanisms when the rotary printing means is at rest during the first part of the machine operation, means to hold the adjusted type sets after they have been adjusted by the differential mechanisms and while the rotatable printing means is rotated during the later part of the machine operation, a drive means for rotating said printing means, a slip printing point, a check printing point, an audit strip printing point, a rockable impression roller at every printing point having a rest and a working position, actuating means for each impression roller to move the rollers from rest position to working position, and control means for the actuating means adapted to release the actuating means for the impression rollers when the type wheel set determined by the control key depressed arrives at the respective printing point during rotation of the printing means.

19. In a machine of the class specified, amount key banks, special key banks, a differential mechanism cooperating with each kind of key banks, a control key, a rotary printing means having rotatably secured thereto around its circumference several type wheel sets of differing characters corresponding to the data to be imprinted by them in the respective machine operation, including a set containing numeral type wheels and a word printing drum for multiple item checks and a corresponding set for the audit strip, means between the differential mechanisms and the type wheel sets to adjust the type wheel sets by the differential mechanism according to amount and special key depressed, while the said rotary printing means is at rest during the first part of the machine operation and to revolve with the drum during the later part of the machine operation, a drive means for rotating said rotary drum, several printing points including an audit strip and a check printing point, a rockable impression roller at each printing point having a rest and a working position, actuating means for the check impression roller, actuating means for the audit strip impression roller, and control means operated under control of the multiple item key and amount keys depressed to cause rocking of both said rollers by their actuating means when the before-named type wheel sets for check and audit strip printing arrive at their respective printing points during rotation of the printing means in multiple item entering operations.

20. In a machine of the class specified, amount key banks, special key banks, a differential mechanism cooperating with each kind of key banks, a rotary printing means, a full data type wheel set secured thereto, means between the differential mechanisms and the type wheel set to adjust the type wheel set by the differential mechanisms according to the amount and the special keys depressed and while the printing means is at rest during the first part of the machine operation, a drive for rotating said rotary printing means after the type wheel sets have been adjusted by the differential mechanisms, several printing points including a slip printing point, a slip feeler arranged at the slip printing point, a rockable impression roller at the slip printing point, and actuating means for said impression roller released by the slip feeler with a slip inserted to cooperate with the type wheel set during rotation of the printing means in the later part of the machine operation.

21. In a machine of the class specified, amount key banks, special key banks, a differential mechanism cooperating with each kind of key banks, control means including a multiple item key, a rotary printing means having rotatably mounted thereon a type wheel set for multiple item checks consisting of numeral type wheels and a word printing drum, connections between the differential mechanism and the type wheels whereby the differential mechanisms adjust the type wheels according to amount and special keys depressed while the printing means is at rest during the first part of the machine operation, a drive for rotating said printing means, an audit strip printing point, a check printing point, a rockable impression roller at each printing point having a rest and a working position, actuating means for the check impression roller, actuating means for the audit strip impression roller, and control means settable under control of the multiple item key to cause shifting of the audit strip and rocking of the check impression roller respectively into their working positions by their actuating means when the check printing type wheel set arrives at the printing point proper during rotation of the drum in the later part of the machine operation.

22. In a machine of the class specified, amount key banks, special key banks, a differential mechanism cooperating with each kind of key bank, a rotary printing drum, a full data type wheel set secured thereto and adapted to be differentiated by the differential mechanism according to the amount and the special keys depressed with the drum at rest during the first part of the machine operation, a drive means for said drum, several printing points including a slip printing point and an audit strip printing point, a slip feeler arranged at the slip printing point, a rockable impression roller at the slip printing point, a rockable impression roller at the audit strip printing point, actuating means for the slip impression roller released by the slip feeler with a slip inserted to cooperate with said full data type wheel set when reaching it, actuating means for the audit strip impression roller, and control means for said latter actuating means operated by the amount keys depressed to cause rocking the audit strip impression roller when the full data type wheel set reaches the audit strip printing point during rotation of the drum.

23. In a machine of the class specified, amount key banks, special key banks, a differential mechanism cooperating with each kind of key bank, a rotary printing drum, two full data type wheel sets secured thereto and adapted to be differentiated by the differential mechanism according to the amount and the special keys depressed with the drum at rest during the first part of the machine operation, a drive means for said drum, several printing points including a slip printing point and an audit strip printing point, a slip feeler arranged at the slip printing point, a rockable impression roller at the audit strip printing point, actuating means for said slip impression roller released by the slip feeler with a slip inserted and cooperating with both said full data type wheel sets to cause two imprints upon the slip, actuating means for the audit strip impression roller and control means for said latter actuating means operated by the amount keys depressed to cause rocking of the audit strip impression roller, when one of the full data type wheel sets reaches the audit strip printing point during rotation of the drum in the later part of the machine operation.

24. In a machine of the class specified, amount key banks, special key banks, a differential mechanism cooperating with each kind of key bank, a rotary printing drum, a type carrier set containing numeral type wheels and a word printing drum, two full data type wheel sets, all said sets secured to the printing drum and adapted to be differentiated by the differential mechanism according to the amount and the special keys depressed with the drum at rest during the first part of the machine operation, a drive means for said drum, several printing points including a check printing and an audit strip printing point, a rockable impression roller at the check printing point having a rest and a working position, actuating means for the check impression roller, control means for the said impression roller actuated by amount keys depressed to rock the impression roller into working position when each of the three sets reach the check printing point, a rockable impression roller at the audit strip printing point, having a rest and a working position, actuating means for the audit strip impression roller and control means for said latter actuating means operated by amount keys depressed to cause rocking of the audit strip impression roller when one of the full data type wheel sets reaches the audit strip printing point during rotation of the drum in the later part of the machine operation.

25. In a machine of the class specified, amount key banks, special key banks, a differential mechanism cooperating with each kind of key banks, machine conditioning keys including a multiple item total key, a rotary printing means, a full data printing wheel set adjustably mounted thereon, and means connecting the printing wheel set to the differential mechanisms whereby the differential mechanism adjusts the printing set under control of the multiple item total key and while the printing means is at rest during the first part of the machine operation, a drive for rotating said drum, a rockable check impression roller having a rest and a working position, actuating means for the impression roller, control means for said actuating means controlled by the multiple item total key to rock the impression roller into working position by its actuating means when the type wheel set reaches the said roller during rotation of the printing means in the later part of the machine operation.

26. In a machine of the class specified, amount key banks, special key banks, a differential mechanism cooperating with each kind of key banks, machine conditioning keys including a multiple item total key, a rotary printing means, two full data printing wheel sets rotatably mounted thereon, and means actuated by the differential mechanism to differentially adjust the data printing wheel sets when the multiple item total key is depressed and while the printing means is at rest during the first part of the machine operation, a drive for rotating said printing means, a rockable check impression roller, a rockable audit strip impression roller, actuating means for each of said rollers, control means for the check impression roller actuating means, control means for the audit strip impression roller actuating means, both said controlling means adjusted under control of the multiple item total key to cause rocking the impression roller when each of said type wheel sets reaches the impression roller and the audit strip roller when only one of said sets reaches the impression roller during rotation of the printing means in the later part of the machine operation.

27. In a machine of the class specified, amount key banks, special key banks, a differential mechanism cooperating with each kind of key banks, control keys including a multiple item slip printing key, a rotary printing device, several type wheel sets including a multiple item set and a full data set mounted on the printing device and adapted to be differentiated by the differential mechanisms according to the amount and special key depressed while the printing device is at rest during the first part of the machine operation, a drive for rotating said printing device, several printing points including a slip and an audit strip printing point, a slip feeler arranged at the slip printing point, several rockable impression rollers including an impression roller at the slip printing point and an impression roller at the audit strip printing point each having a rest and working position, actuating means for the slip impression roller, actuating means for the audit strip impression roller, control means for the first named actuating means controlled by the slip feeler when a slip is inserted into the machine to cause rocking of the slip impression roller into working position when the full data type wheel set reaches the slip printing point, and control means for the second named actuating means controlled by the multiple item slip printing key and the amount keys depressed to cause actuation of the audit strip impression roller when the multiple item type wheel set reaches the audit strip printing point during rotation of the printing device in the later part of the machine operation.

28. In a machine of the class specified, amount key banks, special key banks, a differential mechanism cooperating with each kind of key banks, machine conditioning means including a multiple item slip printing key, a rotary printing device, several type wheel sets including a multiple item set and a full data set mounted thereon and adapted to be differentiated by the differential mechanisms with the multiple item slip printing key depressed and with the printing device at rest during the first part of the machine operation, a drive for rotating said drum, a check printing point, a slip printing point, an audit strip printing point, a slip feeler at the slip printing point, a rockable impression roller at the check printing point, a rockable impression roller at the slip printing point controlled to be disabled by the slip feeler with no slip inserted into the machine, an impression roller for the audit strip, actuating means for the audit strip impression roller, control means for said actuating means controlled by the multiple item slip printing key to cause actuation of the audit strip impression roller when the full data type wheel set reaches said roller, actuating means for the check impression roller and control means for said actuating means controlled by the multiple item slip printing key to cause actuation of the check impression roller when the full data printing set reaches the said roller during rotation of the drum in the later part of the machine operation.

29. In a machine of the class specified, amount key banks, special key banks, a differential mechanism cooperating with each of said key banks for multiple item entering and multiple item total taking machine operations, machine operation conditioning means including a multiple item total slip printing key, a rotary printing device, several type wheel sets including a multiple item set and a full data set secured to the printing device and adapted to be differentiated by the differential mechanisms according to the amount and special keys, when the printing device is at rest during the first part of the machine operation, a drive for rotating said drum, several printing points including a check, a slip and an audit strip printing point, a slip feeler at the slip printing point, a rockable check impression roller, a rockable slip impression roller, a rockable audit strip impression roller, actuating means for the check impression roller, control means for said actuating means adapted to disable said actuating means during multiple item entering and total taking operations with the multiple item total slip printing key depressed, actuating means for the slip impression roller, control means for the said actuating means adapted to prevent actuation of the slip impression roller during multiple item entering and to cause rocking it when the full data type wheel set differentiated to have the multiple item total standing thereon reaches the slip printing point, actuating means for the audit strip impression roller, and control means for the actuating means displaced by the multiple item total slip printing key to cause rocking of the slip impression roller by the actuating means when during rotation of the printing device the multiple item set reaches the roller in multiple item entering and the full data set reaches it in multiple item total taking operations.

30. In a machine of the class specified, a printing device having secured thereto circumferentially a plurality of type wheel sets of different character according to the number and kind of data set thereon and provided with several printing points including a check printing and a slip printing point, control keys, transaction keys, impression rollers provided at each printing point and adapted to cooperate with said type wheel sets, a slip feeler arranged at the slip printing point and adapted to disable the check impression roller with a slip inserted, means for actuating said rollers, and means adapted to control actuation of said rollers with a certain of said transaction keys and a certain control key manipulated to effect imprints upon a check and a slip.

31. In a machine of the class described, the combination of a rotatable drum; a plurality of sets of type carriers supported on the drum; a plurality of platens arranged around the drum and in position to coact with the sets of type carriers when the drum is rotated to take impressions from the sets of type carriers; differential means; a permanent connection between the differential means and all of the sets of type carriers to differentially position all of the sets of type carriers while the drum is stationary, said connection including a planetary gear drive whereby the drum can be rotated while the differential means is stationary; and means for automatically selecting one of the platens for printing from the type carriers.

32. In a machine of the class described, the combination of a rotatable drum; a plurality of sets of type carriers mounted in said drum; differential means to simultaneously set a like amount on said sets of type carriers; a printing platen normally in ineffective position; means to actuate the platen to move it into effective position while the drum is rotated for printing; and selective means to selectively time the movement of the platen into effective position to print from a selected one of said sets of type carriers.

33. In a machine of the class described, the combination of a rotatable drum; a plurality of sets of type carriers mounted on the drum and adjacent the periphery thereof; differential means; connections from the differential means to the type carriers extending inside the drum to differentially set the type carriers, said connections including a floating drive; means to rotate the drum after the type carriers have been set by the differential means, said floating drive adapted to permit rotation of the drum while the type carriers and differential means are stationary; a printing platen adjacent the periphery of the drum but normally out of printing position to take impressions from the type carriers; a plurality of variously timed operating means for the platens; and selecting means to selectively couple the platens to the operating means to synchronize the operation of the printing platens to print from one or another of the sets of type carriers.

34. In a machine of the class described, the combination of a rotatable drum; a plurality of sets of type carriers mounted on the drum and adjacent the periphery thereof; differential means; connections from the differential means to the type carriers extending inside the drum to differentially set the type carriers, said connections including a floating drive; means to rotate the drum after the type carriers have been set by the differential means; said floating drive adapted to permit rotation of the drum while the type carriers and differential means are stationary; a printing platen adjacent the periphery of the drum but normally out of printing position to take impressions from the type carriers; a plurality of variously timed operating means for the platens; a control disc to select an operating means; and differentially settable means, set under control of a keyboard to differentially set the control disc, whereby the operating means moves the printing platen into contact with a certain set of type carriers at the time the type carriers are passing the printing platen as the drum is rotated.

35. In a machine of the class described, the combination of a rotatable drum; means to rotate the drum during a fixed time of a machine cycle; a plurality of sets of type carriers having different characteristics mounted on the drum and adjacent the periphery of the drum; drive means inside the drum including a floating connection to adjust the type carriers simultaneously and while the drum is stationary; a keyboard; differential means connected with the drive connection whereby the type wheels are adjusted in accordance with data set up on the keyboard; a printing platen to take impressions from the type carriers; a plurality of means to actuate the printing platens, each actuating means timed to rock the platen into printing position as an associated set of type carriers passes the printing platen; and a selecting means to selectively connect the printing platen to one of the actuating means to selectively print from the set of type carriers associated with the selected platen actuating means.

36. In a machine of the class described, a rotatable drum; a plurality of sets of type carriers mounted thereon and rotatable therewith; a printing platen to take impressions from the type carriers, normally out of printing relation with the type carriers; an operating means associated with each printing platen; means to selectively couple an operating means with the printing platen to move the printing platen into printing position to coact with the type carriers associated with the selected operating means; and means to differentially position the selecting means.

37. In a printing mechanism for a machine of the class specified, a printing drum having a plurality of type wheel sets mounted thereon, of differing character according to the number and kind of data to be set thereon and provided with several printing points including a check and a slip printing point; control keys; impression rollers provided at each printing point to cooperate with said type wheel sets; a separate means for moving each of said rollers relatively to the type wheel sets; actuating means for each moving means, each moving means being normally disconnected from its actuating means; and means differentially settable under control of the control keys to selectively couple the moving means to the actuating means.

38. In a machine of the class specified, amount key banks; special key banks; a differential mechanism cooperating with each kind of key banks; control keys; a rotary printing device having secured thereto around its circumference several type wheel sets; connections, including a floating support, permanently connecting the differential mechanism and the type wheel sets whereby the type wheel sets are differentially adjusted under control of the amount and special keys while the drum is held stationary during the first part of the machine operation; locking means to hold the type wheel sets in the differentially set positions when the printing device is rotated during the latter part of the machine operation; a drive means for rotating said printing device; and several impression means actuated under the control of the control keys to engage the impression means with the type wheel set as the type wheel set passes the impression means.

39. In a machine of the class specified, amount key banks; special key banks; a differential mechanism cooperating with each kind of key banks; control keys; a rotary printing device having secured thereto around its circumference several type wheel sets; means, including a planetary gear drive, to permanently connect the differential mechanism with the type wheel sets to differentially adjust the type wheel sets while the printing device is at rest during the first part of the machine operation; a drive for rotating said printing device; several rockable impression rollers cooperating with said type wheel sets when the type wheel sets are rotated with the printing device during the latter part of the machine operation; and control means for said impression rollers actuated selectively under control of the control keys.

ERNST BREITLING.
GEORG TOPEL.